US011257459B2

(12) United States Patent
Lee et al.

(10) Patent No.: US 11,257,459 B2
(45) Date of Patent: Feb. 22, 2022

(54) METHOD AND APPARATUS FOR CONTROLLING AN ELECTRONIC DEVICE

(71) Applicant: Samsung Electronics Co., Ltd., Gyeonggi-do (KR)

(72) Inventors: Hoyoung Lee, Seoul (KR); Namin Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/660,319

(22) Filed: Oct. 22, 2019

(65) Prior Publication Data
US 2020/0051522 A1  Feb. 13, 2020

Related U.S. Application Data

(63) Continuation of application No. 14/975,080, filed on Dec. 18, 2015, now abandoned.

(30) Foreign Application Priority Data

Dec. 18, 2014 (KR) .................. 10-2014-0183289
Nov. 9, 2015 (KR) .................. 10-2015-0156883

(51) Int. Cl.
*G09G 5/00* (2006.01)
*G09G 5/377* (2006.01)
(Continued)

(52) U.S. Cl.
CPC .......... *G09G 5/003* (2013.01); *G06K 9/0061* (2013.01); *G06K 9/00604* (2013.01);
(Continued)

(58) Field of Classification Search
CPC .. G06F 3/013; G06K 9/00604; G06K 9/0061; G09G 5/003; G09G 5/377; H04M 1/72569; H04M 2250/52
See application file for complete search history.

(56) References Cited

U.S. PATENT DOCUMENTS 6,483,485 B1   11/2002  Huang et al.
9,406,277 B1*  8/2016  Letourneur .............. G09G 5/10
(Continued)

FOREIGN PATENT DOCUMENTS

CN   101133438   2/2008
CN   101859223   10/2010
(Continued)

OTHER PUBLICATIONS http://www.benq.com/product/LCD/?filter= 186, pp. 11.
(Continued)

*Primary Examiner* — Kwin Xie
(74) *Attorney, Agent, or Firm* — The Farrell Law Firm, P.C.

(57) ABSTRACT

Electronic device including display; memory storing instructions; and one or more processors configured to execute stored instructions to identify event for enabling display; in response to identification of event, identify, based on display setting, whether timing of identification of event is within first time period of a day or second time period of the day; in response to identifying that timing of the identification of the event is within the first time period of the day, control the display to display a first color through the display enabled by the event, based on the display setting; and in response to identifying that the timing of the identification of the event is within the second time period of the day, control the display to display a second color representing a temperature lower than a temperature of the first color through the display enabled by the event, based on the display setting.

20 Claims, 19 Drawing Sheets

(51) Int. Cl.
*H04M 1/72454* (2021.01)
*G06K 9/00* (2006.01)
*G06F 3/01* (2006.01)

(52) U.S. Cl.
CPC ........ *G09G 5/377* (2013.01); *H04M 1/72454* (2021.01); *G06F 3/013* (2013.01); *G09G 2320/0626* (2013.01); *G09G 2320/0666* (2013.01); *G09G 2320/08* (2013.01); *G09G 2340/12* (2013.01); *G09G 2354/00* (2013.01); *H04M 2250/52* (2013.01)

(56) References Cited

U.S. PATENT DOCUMENTS

| | | | | |
|---|---|---|---|---|
| 2006/0110008 | A1* | 5/2006 | Vertegaal | G06T 7/251 382/103 |
| 2008/0117323 | A1 | 5/2008 | Sakamoto | |
| 2009/0055739 | A1 | 2/2009 | Murillo et al. | |
| 2010/0253652 | A1 | 10/2010 | Homma et al. | |
| 2011/0270123 | A1 | 11/2011 | Reiner | |
| 2013/0009867 | A1 | 1/2013 | Woo | |
| 2013/0040708 | A1 | 2/2013 | Gustavsson | |
| 2013/0169523 | A1 | 7/2013 | Huang | |
| 2014/0111690 | A1 | 4/2014 | Kim et al. | |
| 2014/0152792 | A1* | 6/2014 | Krueger | G06K 9/00604 348/78 |
| 2014/0223462 | A1 | 8/2014 | Almone | |
| 2014/0292638 | A1 | 10/2014 | Lee | |
| 2016/0180780 | A1 | 6/2016 | Chen | |

FOREIGN PATENT DOCUMENTS

| | | |
|---|---|---|
| CN | 104077122 | 10/2014 |
| CN | 101382822 | 3/2019 |
| KR | 1019970039546 | 3/1999 |
| KR | 1020070021337 | 2/2007 |
| KR | 1020090077927 | 7/2009 |
| KR | 1020140016107 | 2/2014 |
| TW | 455769 | 9/2001 |
| TW | 201327175 | 7/2013 |
| WO | WO 2005/076258 | 8/2005 |

OTHER PUBLICATIONS http://justgetflux.com/, pp. 2.
http://www.health.harvard.edu/newletters/Harvard_Health_Letter/2012/May/blue-light-has-a-dark-side/, pp. 2.
European Search Report dated May 2, 2016 issued in counterpart application No. 15200877.7-1972, 7 pages.
European Search Report dated Dec. 14, 2017 issued in counterpart application. No. 15200877.7-1972, 8 pages.
Chinese Office Action dated Feb. 5, 2018 issued in counterpart application No. 201510958852.6, 10 pages.
European Search Report dated Feb. 18, 2019 issued in counterpart application No. 15200877.7-1216, 4 pages.
European Search Report dated Oct. 10, 2019 issued in counterpart application No. 15200877.7-1216, 4 pages.
EP Summons to Attend Oral Proceedings dated Sep. 9, 2020 issued in counterpart application No. 15200877.7-1216, 5 pages.
Qihai Wu, Zhejiang Photography Press, "What You See Is What You Get: Color Mangagement For Digital Photographers", 1st Version, Sep. 30, 2013, 3 pages.
Chinese Office Action dated Sep. 3, 2021 issued in counterpart application No. 201910033386.9, 13 pages.
Korean Office Action dated Sep. 23, 2021 issued in counterpart application No. 10-2015-0156883, 7 pages.
KR Notice of Patent Grant dated Dec. 9, 2021 issued in counterpart application No. 10-2015-0156883, 3 pages.

* cited by examiner

| SCREEN OPTIONS | | | |
|---|---|---|---|
| BRIGHTNESS (810) | COLOR | | |
| | CHROMA | | |
| | BRIGHTNESS | | |
| | AUTOMATIC ADJUSTMENT | | |
| SCREEN MODE (820) | SCREEN OPTIMIZATION | | |
| | CLEAR SCREEN | | |
| | STANDARD SCREEN | | |
| | PICTURE-DEDICATED SCREEN | | |
| | MOVIE-DEDICATED SCREEN | | |
| RESOLUTION (830) | HIGH | | |
| | MEDIUM | | |
| | LOW | | |
| BLUE LIGHT (840) | CUTOFF | | |
| | LOW | | |
| | MEDIUM | | |
| | HIGH | | |
| AUTOMATIC ADJUSTMENT (850) | ACTIVATE/DEACTIVATE | | |
| | REGISTER | STANDARD | |
| | | DATA1 | |
| | | DATA2 | |
| | | DATA3 | |
| | DISTINGUISH | WHOLE | |
| | | PROPERTY | |
| | | OBJECT | |
| | DEVICE | USAGE | |
| | | OPERATION | |
| | | ENVIRONMENT | |
| | DISPLAY | ACTIVATE/DEACTIVATE | |
| | | POP-UP | |
| | | STATUS BAR | |
| | | WHOLE | |

FIG.8

METHOD AND APPARATUS FOR CONTROLLING AN ELECTRONIC DEVICE

PRIORITY

This patent application is a Continuation Application of U.S. patent application Ser. No. 14/975,080, filed in the U.S. Patent and Trademark Office (USPTO) on Dec. 18, 2015, which claims priority under 35 U.S.C. § 119(a) to Korean Application Serial Nos. 10-2014-0183289 and 10-2015-0156883, which were filed in the Korean Intellectual Property Office on Dec. 18, 2014 and Nov. 9, 2015 respectively, the entire content of each of which is incorporated herein by reference.

BACKGROUND

1. Field of the Disclosure

The present disclosure relates to a method and apparatus for detecting the state of a user and for controlling an electronic device based on the detected state.

2. Description of the Related Art

As digital technologies have developed, various types of electronic devices have been widely utilized, such as mobile communication terminals, smart phones, tablet Personal Computers (PC), Personal Digital Assistants (FDA), electronic organizers, notebook computers, wearable devices, Television (TV), and the like. The electronic devices have reached a level of mobile convergence that includes the functions of other devices. For example, the electronic devices may provide various communication functions, such as a voice call, a video call, a message transmission/reception function, such as Short Message Service (SMS)/Multimedia Message Service (MMS), e-mail, an electronic organizer function, a photographing function, a broadcast program playback function, a video playback function, a music playback function, an Internet access function, a messenger function, a game function, a Social Networking Service (SNS) function, and the like.

The amount of time that users spend with the electronic devices has been increasing as the electronic devices have provided various functions. The propagation of a large number of electronic devices enables the users to use various electronic devices irrespective of time and place. A user may view a high-visibility and high-definition image screen through an electronic device, or may utilize a predetermined application such as a game for long hours. Therefore, as users increase their use of electronic devices, the amount of time that these users are exposed to light that is generated from the electronic devices has increased.

Therefore, as the time a user spends with an electronic device becomes longer, the fatigue of the user's eyes increases, and this may badly affect the user, such as a loss of vision, dry eye syndrome, bloodshot eyes, and the like. Fatigue of the eyes may not only affect the eyes but may also affect brain activity and cause difficulty in concentrating, a loss of memory, and mental disorder.

SUMMARY

According to aspects of the present disclosure, an electronic device is provided. The electronic device includes a display; a memory storing instructions; and one or more processors configured to execute the stored instructions to identify an event for enabling the display; in response to the identification of the event, identify, based on a display setting, whether a timing of the identification of the event is within a first time period of a day or a second time period of the day; in response to identifying that the timing of the identification of the event is within the first time period of the day, control the display to display a first color through the display enabled by the event, based on the display setting; and in response to identifying that the timing of the identification of the event is within the second time period of the day, control the display to display a second color representing a temperature lower than a temperature of the first color through the display enabled by the event, based on the display setting.

According to aspects of the present disclosure, a method executed in an electronic device with a display is provided. The method includes identifying an event for enabling a display; in response to the identification of the event, identifying, based on a display setting, whether a timing of the identification of the event is within a first time period of a day or a second time period of the day; displaying, in response to identifying that the timing of the identification of the event is within the first time period of the day, a screen of the display in a first color through the display enabled by the event, based on the display setting; and displaying, in response to identifying that the timing of the identification of the event is within the second time period of the day, the screen of the display in a second color representing a temperature lower than a temperature of the first color through the display enabled by the event, based on the display setting.

According to aspects of the present disclosure, a non-transitory computer readable recording medium having stored thereon a plurality of instructions is provided, which when executed by one or more processors of an electronic device with a display, perform a method. The method includes identifying an event for enabling a display; in response to the identification of the event, identifying, based on a display setting, whether a timing of the identification of the event is within a first time period of a day or a second time period of the day; displaying, in response to identifying that the timing of the identification of the event is within the first time period of the day, a screen of the display in a first color through the display enabled by the event, based on the display setting; and displaying, in response to identifying that the timing of the identification of the event is within the second time period of the day, the screen of the display in a second color representing a temperature lower than a temperature of the first color through the display enabled by the event, based on the display setting.

BRIEF DESCRIPTION OF THE DRAWINGS

The above and other aspects, features, and advantages of the present disclosure will be more apparent from the following detailed description taken in conjunction with the accompanying drawings, in which:

FIG. 8 is a diagram illustrating an example of a setting menu provided in an electronic device according to an embodiment of the present disclosure;

DETAILED DESCRIPTION

Figure 1:
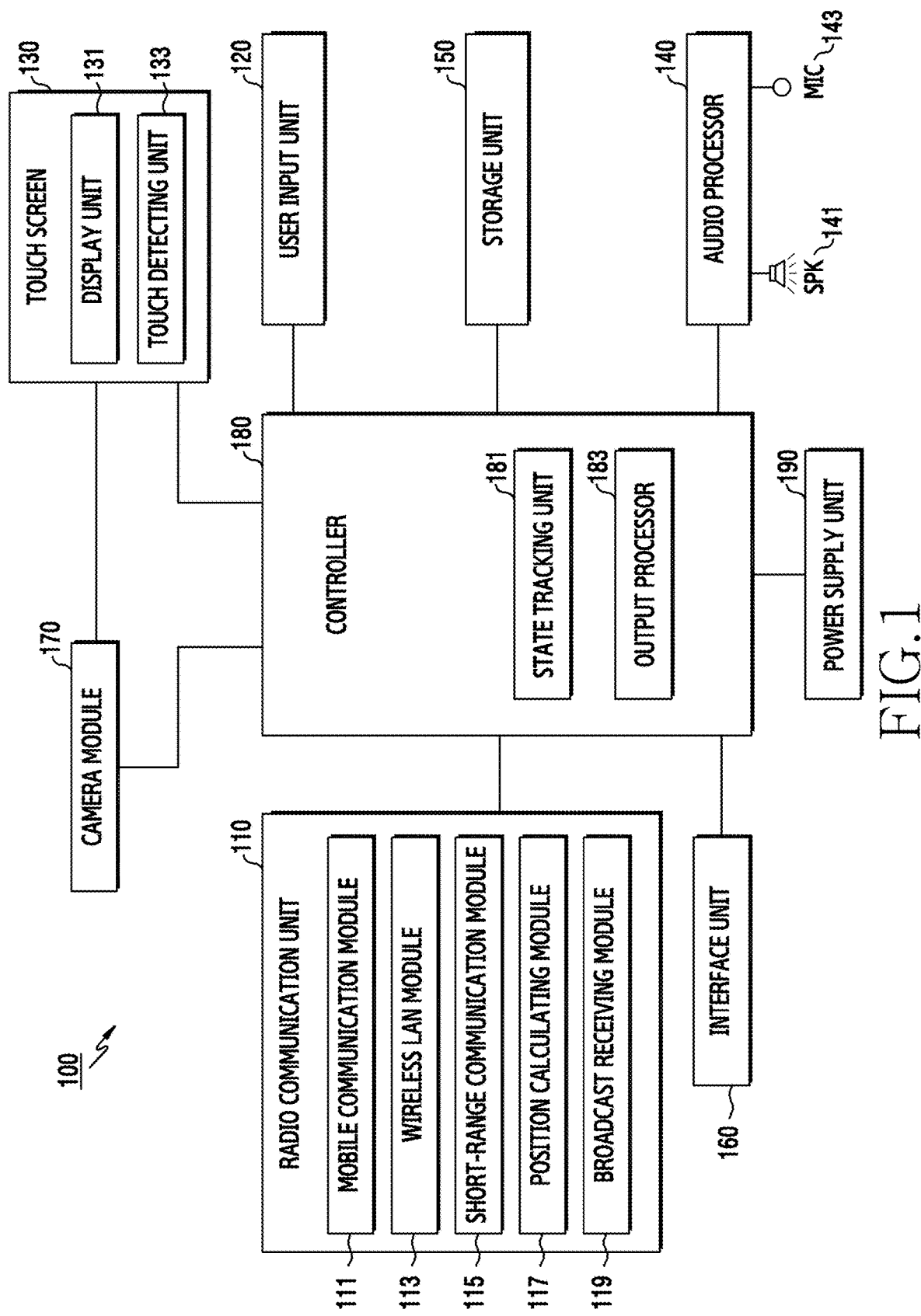
FIG. 1 is a block diagram schematically illustrating a configuration of an electronic device according to an embodiment of the present disclosure.

Hereinafter, various embodiments of the present disclosure will be described with reference to the accompanying drawings. However, it should be understood that there is no intent to limit the present disclosure to the particular forms disclosed herein, rather, the present disclosure should be construed to cover various modifications, equivalents, and/or alternatives of embodiments of the present disclosure. In describing the drawings, similar reference numerals may be used to designate similar constituent elements.

The present disclosure relates to an electronic device that responds to the fatigue rate of user's eyes, and to a display control method of the electronic device. Various embodiments of the present disclosure provide an electronic device and an operation method thereof, which tracks the state of a user and the state of the electronic device, and automatically changes various options associated with displaying a screen of the electronic device based on a result of tracking.

According to embodiments of the present disclosure, the state of a user's eyes that view an electronic device is measured and the fatigue rate of the user's eyes may be analyzed. According to embodiments of the present disclosure, the fatigue rate of the user's eyes may be analyzed by additionally using various contexts of an electronic device (for example, usage time, ambient environment, operation state, and the like), in addition to the measured state of user's eyes. For example, according to embodiments of the present disclosure, the fatigue rate of the user's eyes may be analyzed based on a result of measuring the state of the user's eyes (for example, state information), or may be analyzed by taking into consideration multiple elements, such as the result of measuring the state of the user's eyes and a result obtained through context consideration with respect to the electronic device (for example, context information).

According to embodiments of the present disclosure, a screen may be displayed by automatically changing a screen option based on the fatigue rate of the user's eyes which is analyzed through multiple elements. That is, embodiments of the present disclosure automatically adjust various screen setting options (variables) for displaying a screen based on the fatigue rate of the user's eyes, so as to display a screen that is appropriate for the fatigue rate of the user's eyes.

According to embodiments of the present disclosure, information associated with the fatigue rate of user's eyes analyzed using multiple elements may be directly fed back to a user.

According to various embodiments of the present disclosure, an electronic device may include all devices that use one or more of various processors, including an Application Processor (AP), a Graphic Processing Unit (GPU), a Central Processing (CPU), and the like, such as all information telecommunication devices that support functions associated with various embodiments of the present disclosure, multimedia devices, wearable devices, and applications thereof.

According to an aspect of the present disclosure, there is provided a computer readable recording medium that records a program for implementing operations, the operations including detecting an operation event, tracking the state of a user and the state of an electronic device in response to the operation event, changing an option associated with displaying a screen in the electronic device, based on the result of tracking, and outputting a result corresponding to the changed option.

An electronic device and an operation method thereof according to an embodiment of the present disclosure may automatically change various options associated with displaying a screen by taking into consideration the states of a user and the electronic device, and feeds back the information associated with the state of the user. Changing an option and feeding back information may be executed by automatically tracking the user and the electronic device while the user normally uses the electronic device, and may intuitively protect the eyes of the user and provide the user with guidance in real time. Therefore, according to embodiments of the present disclosure, the electronic device enables the user to avoid potential harm, and adaptively supports a health care service. In the case of an electronic device (for example, Head Mounted Display (HMD)) that causes the user's eyes to view a screen in a relatively short distance, the user's eyes are prevented from being badly affected by light generated from the screen.

According to embodiments of the present disclosure, various options of a screen or a filter (e.g., intensity, brightness, blue light, and the like) are automatically adjusted based on various states that are tracked (e.g., the state of a user and the state of an electronic device). Therefore, according to embodiments of the present disclosure, convenience for users is provided by automatically adjusting various options when compared to the conventional technology, which only adjusts the brightness of a screen using a notification bar of the electronic device. When a user uses an electronic device at night, the user may set the brightness of a screen to be darker than the lowest brightness level of existing native settings, thereby effectively preventing glare.

According to embodiments of the present disclosure, the method and apparatus do not only adjust a predetermined option (for example, brightness or level of blue light) based on a predetermined condition, such as time, but also automatically adjust one or more options based on the state of a user who uses an electronic device, the context of the application under execution (for example, a video (movie), Internet access, a messenger, a game, and the like), the usage time when an application or an electronic device is used, the ambient environment where an electronic device is used, thereby providing the user with an optimal screen. According to embodiments of the present disclosure, an electronic device automatically informs a user of the state of bloodshot eyes while the user uses the electronic device, automatically adjusts a screen option accordingly, and notifies the user of the state of the eyes resulting in an increase in the care of the user's health.

Hereinafter, various embodiments of the present disclosure will be described from the perspective of hardware. However, various embodiments of the present disclosure include technology that uses both hardware and software, and thus, the various embodiments of the present disclosure may not exclude a method from the perspective of software.

FIG. 1 is a schematic block diagram of a configuration of an electronic device according to an embodiment of the present disclosure.

Referring to FIG. 1, an electronic device 100 may include a radio communication unit 110, a user input unit 120, a touch screen 130, an audio processor 140, a storage unit 150, an interface unit 160, a camera module 170, a controller 180, and a power supply unit 190. According to various embodiments of the present disclosure, the electronic device 100 may include fewer or more component elements when compared to the component elements of FIG. 1, since the component elements of FIG. 1 are not a prerequisite.

The radio communication unit 110 may include one or more modules that enable radio communication between the electronic device 100 and a radio communication system or between the electronic device 100 and another external device. For example, the radio communication unit 110 may be configured to include a mobile communication module 111, a wireless local area network (WLAN) module 113, a short-range communication module 115, a position calculating module 117, a broadcast receiving module 119, and the like.

The mobile communication module 111 may transmit and receive a wireless signal to/from at least one of a base station, an external electronic device, and various servers (e.g., an integration server, a service provider server, a content server, an Internet server, and a cloud server) on a mobile communication network. The wireless signal may include various types of data used when reference data (e.g., iris image), voice call signals, video call signals, or text/multimedia messages are transmitted or received.

The mobile communication module 111 may receive one or more pieces of data (e.g., reference data, media content, a message, an email, an image, a video, weather information, location information, time information, and the like). According to an embodiment of the present disclosure, the mobile communication module 111 may receive various pieces of data by being connected with at least one external device (e.g., another electronic device or a server) which are connected with the electronic device 100 over a network (e.g., mobile communication network). The mobile communication module 111 may transmit to an external device various data required for the operation of the electronic device 100, in response to a user's request.

The mobile communication module 111 may execute a communication function. For example, the mobile communication module 111 may convert a radio frequency (RF) signal into a baseband signal and transmit the same to the controller 180 under the control of the controller 180, or may convert the base band signal from the controller 180 into an RF signal and transmit the same. The controller 180 may process a baseband signal based on various communication schemes. For example, the communication scheme may include a Global System for Mobile communication (GSM) scheme, an Enhanced data GSM environment (EDGE) communication scheme, a Code Division Multiple Access (CDMA) communication scheme, a W-Code Division Multiple Access (W-CDMA) communication scheme, a Long Term Evolution (LTE) communication scheme, a Long Term Evolution Advanced (LTE-A) communication scheme, an Orthogonal Frequency Division Multiple Access (OFDMA) communication scheme, a Wi-Fi communication scheme, a World Interoperability for Microwave access (WiMax) communication scheme, a Bluetooth communication scheme, however the communication scheme may not be limited thereto.

The wireless LAN module 113 may be a module for establishing wireless internet access and a wireless LAN link with other electronic devices. The wireless LAN module 113 may be embedded in the electronic device 100 or may separately exist outside the electronic device 100. Wireless Internet technology may include WiFi, wireless broadband (Wibro), World interoperability for Microwave access (WiMax), High Speed Downlink Packet Access (HSDPA), millimeter wave (mm Wave), and the like.

The wireless LAN module 113 may transmit or receive one or more pieces of data selected by a user, to/from the electronic device 100. According to an embodiment of the present disclosure, the wireless LAN module 113 may obtain data from at least one of another electronic device or a server, which are connected with the electronic device 100 over a network (for example, wireless Internet network). The wireless LAN module 113 may transmit or receive various data of the electronic device 100 to/from the outside (e.g., server) in response to a user's request. The wireless LAN module 113 may transmit or receive, to/from another electronic device, various data corresponding to a user's selection when a wireless LAN link is established with another electronic device. The wireless LAN module 113 may always maintain an on-state, or may be turned on based upon settings of the electronic device 100 or user input.

The short-range communication module 115 may be a module for performing short-range communication. The short-range communication technology may include Bluetooth, Bluetooth low energy (BLE), a Radio Frequency Identification (RFID), Infrared Data Association (IrDA), Ultra Wideband (UWB), Zigbee, Near Field Communication (NFC), and the like.

The short-range communication module 115 may receive one or more pieces of data. According to an embodiment of the present disclosure, the short-range communication module 115 may obtain data from another electronic device that is connected with the electronic device 100 over a network (for example, a short-range communication network). The short-range communication module 115 may transmit or receive, to/from another electronic device, various data corresponding to a user's selection when short-range communication is established with another electronic device. The short-range communication module 115 may always maintain an on-state, or may be turned on based upon settings of the electronic device 100 or user input.

The position calculating module 117 may be a module for obtaining the location of the electronic device 100, and may include a global position system (GPS) module as a representative example. The position calculating module 117 may measure the location of the electronic device 100, based on the principal of triangulation. The position calculating module 117 may calculate three dimensional information on a current position according to a latitude, a longitude, and an altitude, by calculating the distance from three or more base stations and time information, and then applying trigonometry to the calculated information. Furthermore, the position calculating module 117 may calculate position information by continuously receiving position information of the electronic device 100 from three or more satellites in real time.

The position information of the electronic device 100 may be obtained by various methods.

The broadcast receiving module 119 may receive a broadcast signal (e.g., a TV broadcast signal, a radio broadcast signal, a data broadcast signal, and the like) and/or broadcast related information (e.g., information associated with a broadcast channel, a broadcast program, or a broadcast service provider) from an external broadcast management server through a broadcast channel (e.g., a satellite broadcast channel, a terrestrial broadcast channel, and the like).

The user input unit 120 may generate input data for controlling the operations of the electronic device 100 in response to a user input. The user input unit 120 may include at least one input device for detecting various inputs of the user. For example, the user input unit 120 may include a key pad, a dome switch, a physical button, a touch pad (resistive/capacitive type), jog & shuttle, a sensor, and the like.

According to embodiments of the present disclosure, the sensor may be embodied by various sensors for context recognition with respect to the electronic device 100. For example, the sensor may measure a physical quantity or detect an operation state of the electronic device 100, and may convert the measured or detected information to an electrical signal. The sensor may include, for example, an iris scan sensor, a finger scan sensor, an image sensor, or an illuminance sensor. The sensor may include at least one of a gesture sensor, a gyro sensor, a pressure sensor, a magnetic sensor, an acceleration sensor, a terrestrial sensor, a motion recognition sensor, a grip sensor, a proximity sensor, a color sensor (e.g., red, green, and blue (RGB) sensor), a medical sensor, a temperature-humidity sensor), a Ultra Violet (UV) sensor, or a heart rate monitor (HRM) sensor. The sensor may include, for example, an E-nose sensor, an electromyography (EMG) sensor, an electroencephalogram (EEG) sensor, an electrocardiogram (ECG) sensor, an infrared (IR) sensor, and the like. According to embodiments of the present disclosure, the electronic device 100 may further include a processor configured to control the sensor, separately or as a part of the controller 180, and may control the sensor while the controller 180 is in a sleep state.

A part of the user input unit 120 may be embodied outside the electronic device 100 in a form of a button, or a part or the whole user input unit 120 may be embodied as a touch panel. The user input unit 120 may receive a user input for initiating the operations of the electronic device 100 according to various embodiments of the present disclosure, or may generate an input signal based on a user input. For example, the user input unit 120 may receive various user inputs for executing a state tracking function, executing an iris scan function, executing an application, inputting (writing or inserting) data, changing the position of the electronic device 100, displaying content, connecting to a network, transmitting or receiving data, and may generate an input signal based on the user input.

The touch screen 130 may be an input/output device that simultaneously executes an input function and a display function, and may include a display unit 131 and a touch sensing unit 133. The touch screen 130 may provide an input/output interface between the electronic device 100 and the user, and may transfer a touch input of the user to the electronic device 100, and may serve as a medium that shows an output from the electronic device 100 to the user. The touch screen 130 may show a visual output to the user. The visual output may be shown in a form of a combination of text, graphics, and videos. For example, according to embodiments of the present disclosure, the touch screen 130 may display various screens associated with operations of the electronic device 100, through the display unit 131. The various screens may include, for example, an iris scan screen, an iris scan result screen, a fatigue rate measuring result screen, a messenger screen, a call screen, a game screen, a video playback screen, a gallery screen, a webpage screen, a home screen, a group network connection screen, and the like.

The touch screen 130 may detect an event based on at least one of a touch, a hovering, and an air gesture, which are provided by a user, through the touch detecting unit 133, while displaying a predetermined screen through the display unit 131, and may transfer an input signal associated with the event to the controller 180. The controller 180 may distinguish a transferred event and control executing an operation based on the distinguished event.

The display unit 131 may display various information processed in the electronic device 100. For example, the display unit 131 may display a User Interface (UI) or Graphic User Interface (GUI) associated with iris scanning when the electronic device 100 operates in an iris scanning mode. The display unit 131 may display a UI or a GUI associated with a call when the electronic device 100 is in a call mode. The display unit 131 may display a photograph or/and received image and a UI or GUI associated with operating a corresponding mode, when the electronic device 100 is in a video call mode or a photographing mode. The display unit 131 may display data associated with the use of the electronic device 100, content, or information associated with other electronic devices which are connected to a network. The display unit 131 may display various application screens corresponding to an executed application.

The display unit 131 may support displaying a screen based on a landscape mode, displaying a screen based on a portrait mode, or displaying a screen based on a change between the landscape mode and the portrait mode, according to a rotation direction (or an orientation) of the electronic device 100. The display unit 131 may use various displays. For example, the display unit 131 may include a Liquid Crystal Display (LCD), a Light-Emitting Diode (LED) display, an Organic Light-Emitting Diode (OLED) display, a MicroElectroMechanical Systems (MEMS) display, and an electronic paper display, and the like. The display unit may be embodied as a transparent display formed in a transparent type or optical transparent type.

The touch detecting unit 133 may be mounted on the display unit 131, and may detect a user input that is in contact with or in proximity to the surface of the touch screen 130. The user input may include a touch event or a proximity event that is input based on at least one of a single-touch, a multi-touch, hovering, and an air gesture. For example, the user input may be input by a tap, a drag, a sweep, a flick, a drag & drop, or a drawing gesture (e.g., writing) and the like. The touch detecting unit may detect a user input (e.g., a touch event or a proximity event) on the surface of the touch screen 130, generate a signal corresponding to the detected user input, and transfer the same to the controller 180. The controller 180 may control the execution of a function corresponding to an area where the user input is generated by the signal transferred from the touch detecting unit 133.

The touch detecting unit 133 may receive a user input for initiating operations of the electronic device 100 according to embodiments of the present disclosure, or may generate an input signal based on a user input. The touch detecting unit 133 may be configured to convert a pressure applied to a predetermined part of the display unit 131 or a change in a capacitance generated from a predetermined part of the display unit 131, into an electrical input signal. The touch detecting unit 133 may detect a location and an area where an input means or device (e.g., a user's finger, an electronic pen, and the like) touches or approaches the surface of the display unit 131. The touch detecting unit 133 may be configured to even detect surface pressure when a touch is performed, based on an applied touching scheme. When a touch or proximity input with respect to the touch detecting unit 133 exists, a signal(s) corresponding thereto may be transferred to a touch screen controller. The touch screen controller may process the signal(s), and transfer the corresponding data to the controller 180. Accordingly, the controller 180 may determine an area of the touch screen 130 where a touch or proximity input is performed, and may process the execution of a function corresponding thereto.

The audio processor 140 may transmit an audio signal received from the controller 180 to a speaker (SPK) 141, and may transfer to the controller 180 an audio signal such as a voice, which is input from a microphone 143. The audio processor 140 may convert voice/sound data into audible sound through the speaker 141 based on the control of the controller 180 and may output the audible sound. The audio processor 140 may convert an audio signal such as a voice or sound which is received from the microphone 143 into a digital signal and may transfer the digital signal to the controller 180. The audio processor 140 may output an audio signal that responds to an user input, based on audio processing information (e.g., sound effect, music file, and the like) included in the data.

The speaker 141 may output audio data that is received from the radio communication unit 110 or stored in the storage unit 150. The speaker 141 may output a sound signal associated with various operations (functions) executed in the electronic device 100. The speaker 141 may control outputting an audio stream such as a voice recognition function, a digital recording function, and a phone call function. Although not illustrated in embodiments of the present disclosure, the speaker 141 may be an attachable and detachable ear phone, a head phone, or a head set connected to the electronic device 100 through an external connection port.

The microphone 143 may receive an external sound signal and process the same as electrical data. The voice data processed through the microphone 143 may be converted into a form that is transmitted to the outside through the mobile communication module 111 when the electronic device 100 is in a voice call mode. Various noise reduction algorithms may be implemented in the microphone 143 to remove noise generated in the process of receiving an external sound signal. The microphone 143 may control inputting an audio stream such as a voice recognition function, a digital recording function, and a phone call function. For example, the microphone 143 may convert a voice signal into an electrical signal. According to embodiments of the present disclosure, the microphone 143 may include an embedded microphone that is contained in the electronic device 100 and an external microphone that is connected to the electronic device 100.

The storage unit 150 may store one or more programs executed by the controller 180 and also perform a function of temporarily storing input/output data. The input/output data may include, for example, reference data, option setting information, fatigue rate information, state information, context information, a record file, content, messenger data (for example, conversation data), contact information (for example, wired or wireless phone number), a message, a media file (for example, an audio file, a video file, an image file), and the like. According to embodiments of the present disclosure, the storage unit 150 may store one or more pieces of information corresponding to tracking the state of a user and tracking the state of the electronic device 100.

The storage unit 150 may store various programs and data associated with display control function of the electronic device 100. For example, according to embodiments of the present disclosure, when tracking the state of the user and the state of the electronic device 100 (e.g., context recognition) is executed in response to an operation event for initiating the operations of the present disclosure, and the fatigue rate of the user and information for adjusting a screen option are obtained based on at least one of state information and context information, which are obtained based on state tracking. The storage unit 150 may store one or more programs that execute a process to automatically change the options of a screen based on the obtained adjustment information and data processed accordingly (e.g., recognition result, fatigue rate, state information, context information, and adjustment information).

The storage unit 150 may store data related to frequency of use (e.g., frequency of use of reference data, an application, content, and the like), importance, and priority. The storage unit 150 may store data associated with vibrations and sounds of various patterns that are output in response to a touch input or a proximity input applied on the touch screen 130. The storage unit 150 may continuously or temporarily store an Operating System (OS) of the electronic device 100, a program associated with controlling input and display through the touch screen 130, a program associated with controlling various operations and functions of the electronic device 100, and various data generated by operations of each program.

The storage unit 150 may include an extendable memory (e.g., an external memory) or an embedded memory. The storage unit 150 may include at least one type of storage medium from among a flash memory type memory, a hard disk type memory, a micro type memory, a card type memory (for example, a Secure Digital (SD) card, an eXtream Digital (XD) card, and the like), a Dynamic Random Access Memory (DRAM), a Static RAM (SRAM), a Read-Only Memory (ROM), a Programmable ROM (PROM), an Electrically Erasable PROM (EEPROM), a Magnetic RAM (MRAM), a magnetic disk, and an optical disk. The electronic device 100 may also operate in relation to a web storage performing a storage function of the storage unit 150 on the Internet.

The storage unit 150 may store various software. For example, the component elements of software may include, an operating system, a software module, a communication software module, a graphic software module, a user interface software module, a Moving Picture Experts Group (MPEG) codec module, a camera software module, and one or more application software modules, and the like. A module, which is an element of software, may be expressed as a set of instructions, and thus, the module is also expressed as an instruction set. The module is also expressed as a program. According to embodiments of the present disclosure, the storage unit 150 may include an additional module (instructions) in addition to the above described modules. The storage unit 150 may not use some modules (instructions) when necessary.

The operating system software module may include various software component elements that control the general system operation. The control of such general system operations refers to, for example, memory management and control, storage hardware management and control, power management and control, and the like. The operating system software module may execute a function that supports communication between various hardware devices and software component elements (modules).

The communication software module may enable communication with another electronic device, such as a computer, a server, a portable terminal, and the like, through the radio communication unit 110. The communication software module may be conform to a protocol structure corresponding to a corresponding communication scheme.

The graphic software module may include various software component elements for providing and displaying graphics on the touch screen 130. The term "graphics" includes text, a webpage, an icon, a digital image, a video, an animation, and the like.

The user interface software module may include various software component elements associated with a user interface (UI). For example, the user interface software module may include information associated with how the state of the user interface is changed, a condition where the state of the user interface is changed, and the like.

The MPEG module may include a software component element that enables processes and functions (e.g., generating, coding, decoding, playing back, distributing, and transmitting a content, and the like) associated with digital content (e.g., video or audio).

The camera software module may include a software component element associated with a camera that enables processes and functions associated with a camera.

The application module may include applications for enabling a web browser including a web page rendering engine, an email, an instant message, word processing, keyboard emulation, an address book, a touch list, a widget, digital right management (DRM), iris scan, context recognition, voice recognition, a position determining function, a location based service, and the like. According to various embodiments of the present disclosure, the application module may include instructions for iris scanning and context recognition. For example, the application module may process an operation (function) that obtains a tracking result based on set information when iris scanning is executed, provides information corresponding to the obtained result, and automatically changes a screen option based on the obtained result.

The interface unit 160 may serve as an interface with all external devices that are connected to the electronic device 100. The interface unit 160 may receive data or power from an external device and transmit the same to each component element of the electronic device 100, or enable data inside the electronic device 100 to be transmitted to an external device. For example, the interface unit 160 may include a wired/wireless headset port, an external charger port, a wired/wireless data port, a memory card port, a port for connecting a device equipped with an identification module, an audio input/output port, a video input/output port, an earphone port, and the like.

The camera module 170 supports a function of photographing. The camera module 170 may support capturing an image (a still image or a moving image) of a subject. The camera module 170 may photograph a subject based on the control of the controller 180, and may transfer the photograph data to the display unit 131 and the controller 180. The camera module 170 may include an image sensor (or a camera sensor) for converting an input optical signal into an electric signal and an image signal processor for converting the electric signal input from the image sensor into digital image data. The image sensor may include a sensor using a Charge-Coupled Device (CCD) or a Complementary Metal-Oxide-Semiconductor (CMOS). The camera module 170 may include one or more image sensors. For example, the camera module 170 may include a front sensor (e.g., front camera) contained in the front of the electronic device 100 (e.g., a plane that is identical to the display unit 131) and a back sensor (e.g., back camera) contained in the back side of the electronic device 100. The camera module 170 may support photographing according to various photographing options (e.g., zooming, a screen ratio, an effect (e.g., sketch, mono, sepia, vintage, mosaic, and a picture frame)) according to the user's settings.

The controller 180 may control general operations of the electronic device 100. For example, the controller 180 may execute a control associated with a voice communication, a data communication, a video communication, and the like. The controller 180 may include one or more processors or the controller 180 may be referred to as a processor. For example, the controller 180 may include a Communication Processor (CP), an Application Processor (AP), an interface (e.g., General Purpose Input/Output (GPM)), an embedded memory, and the like as separate component elements, or may integrate the above component elements as one or more integrated circuits. The application processor may execute various software programs and perform various functions for the electronic device 100, and the communication processor may execute a process and a control for the voice communication and data communication. The controller 180 may execute a predetermined software module (instruction set) stored in the storage unit 150 and execute various predetermined functions corresponding to the software module.

According to embodiments of the present disclosure, the controller 180 may control an operation associated with executing a display control function. For example, the controller 180 may initiate a tracking operation such as iris scan, context recognition, and the like, in response to an operation event of the electronic device 100. The controller 180 may obtain user-based state information and electronic device 100 based context information according to the tracking operation. The controller 180 may control an operation associated with feeding back the fatigue rate of the user, based on the state information. The controller 180 may execute a process to automatically change a screen option to correspond to the fatigue rate of the user, based on at least one of the state information and the context information, and to display a screen accordingly. The controller 180 may execute a process to store various information (e.g., state measurement result, iris image, reference data) associated with a result of tracking.

According to embodiments of the present disclosure, the controller 180 may execute a display control operation of the electronic device 100 according to embodiments of the present disclosure by interworking with the software modules stored in the storage unit 150. According to various embodiments of the present disclosure, the controller 180 may be embodied as one or more modules that process the above described various functions.

According to embodiments of the present disclosure, the controller 180 may be embodied as one or more processors that execute one or more programs stored in the storage unit 150 and control the operations of the electronic device 100 according to various embodiments of the present disclosure. For example, the controller 180 may be embodied by including a state tracking unit 181 that includes an operation event detecting module, a tracking module, a calculating module and an output processor 183 that includes a variable setting module and a result outputting module.

According to embodiments of the present disclosure, the state tracking unit 181 indicates a configuration that detects an operation event for initiating a display control function of the present disclosure, and processes tracking with respect to the states of the user and the electronic device 100 in response to the operation event. The state tracking unit 181 may process an operation associated with obtaining a fatigue rate of the user and information (e.g., adjustment information) for changing a screen option, based on a result of tracking.

According to embodiments of the present disclosure, the output processor 183 may process an operation associated with outputting a result corresponding to the fatigue rate and the information for changing the option, which are obtained from the result of executing operations of the state tracking unit 181. For example, the output processor 183 may process a feedback, by which a notification is provided to the user based on the fatigue rate, and may execute a process to change one or more variables associated with the screen option based on the adjustment information and to display the screen accordingly.

The controller 180, according to various embodiments of the present disclosure may control various operations associated with normal functions of the electronic device 100, in addition to the above described functions. For example, when a specific application is executed, the controller 180 may control an operation and displaying of a screen for the specific application. The controller 180 may receive input signals corresponding to various touch event inputs or proximity event inputs that are supported by a touch-based or proximity-based input interface (e.g., the touch screen 130), and control operating functions corresponding thereto. The controller 180 may also control data transmission/reception based on wired communication or wireless communication.

The power supply unit 190 may receive external power or internal power based on the control of the controller 180, and may supply power required for the operation of each component element. According to embodiments of the present disclosure, the power supply unit 190 may control supplying power to the display unit 131, the camera module 170, and the like, based on the control of the controller 180.

The various embodiments of the present disclosure may be implemented in a recording medium, which can be read through a computer or a similar device, by using software, hardware, or a combination thereof. According to the hardware implementation, the embodiments of the present disclosure may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and electrical units for performing other functions.

According to embodiments of the present disclosure, a computer readable recording medium that stores a program for implementing operations including: detecting an operation event; tracking the state of a user and the state of an electronic device in response to the operation event; changing an option associated with displaying a screen in the electronic device, based on a result of tracking and outputting a result corresponding to the changed option.

In some cases, the embodiments described in the present disclosure may be implemented by the controller 180 in itself. According to a software implementation, the embodiments such as procedures and functions described in the present disclosure may also be implemented as separate software modules. The software modules may perform one or more functions and operations described in the present disclosure.

According to embodiments of the present disclosure, at least some of the functions (e.g., a display control function) executed by the electronic device 100 may be executed by an external device such as a server. For example, the server may include a processing module corresponding to the controller 180, and process through the processing module, at least some of the functions associated with obtaining the fatigue rate of a user and adjustment information for setting a screen option, based on at least some of state information and context information transmitted from the electronic device 100, and transmit a result to the electronic device 100.

Figure 2:
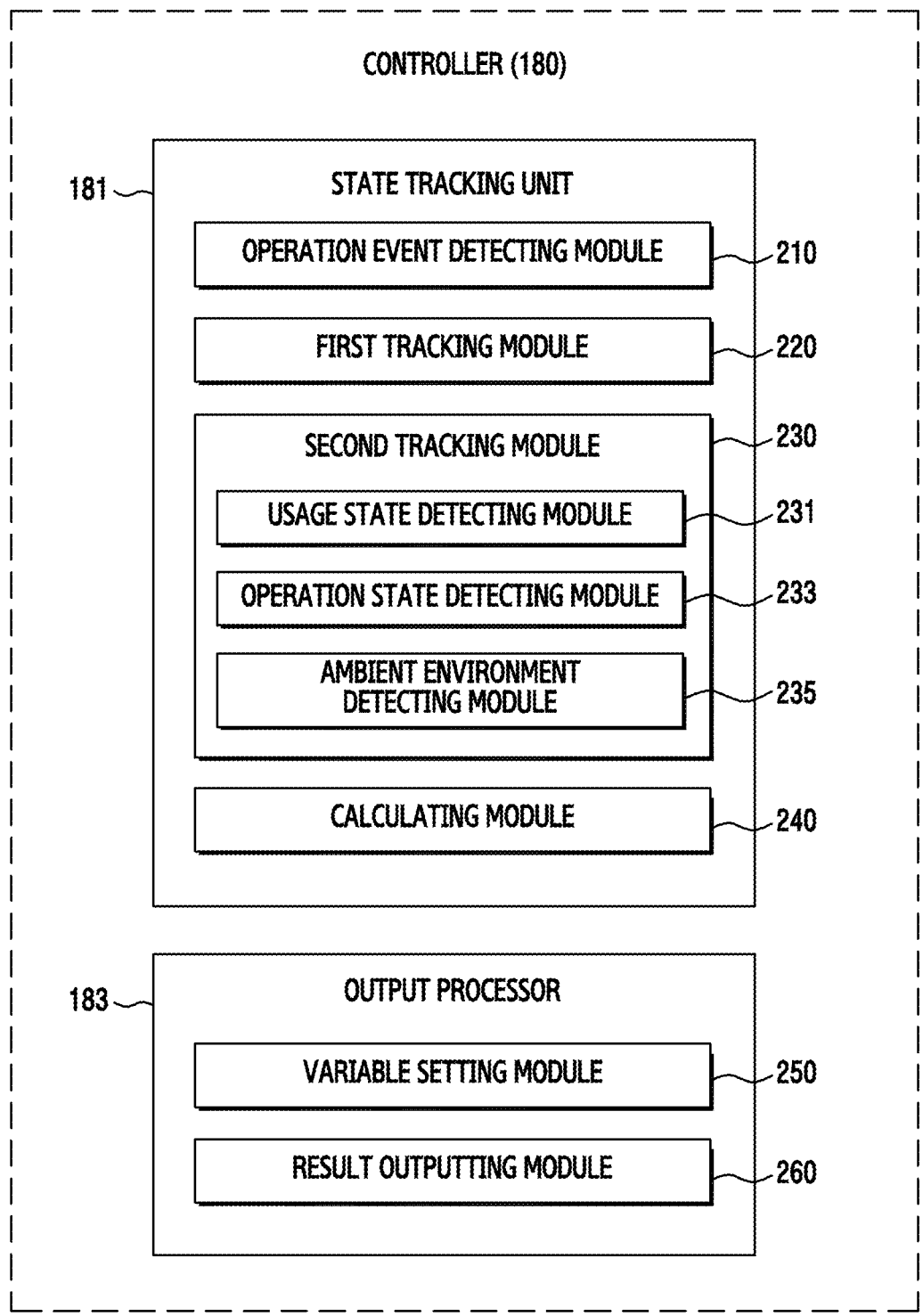
FIG. 2 is a block diagram illustrating a configuration of a controller of an electronic device according to an embodiment of the present disclosure.

FIG. 2 is a diagram illustrating a configuration of a controller 180 of an electronic device according to an embodiment of the present disclosure.

Referring to FIG. 2, the controller 180 of the electronic device 100 according to embodiments of the present disclosure, may include the state tracking unit 181 and the output processor 183, as described above.

According to embodiments of the present disclosure, the state tracking unit 181 may include an operation event detecting module 210, a first tracking module 220, a second tracking module 230, and a calculating module 240.

The operation event detecting module 210 may detect an operation event for initiating a display control function (e.g., state tracking) according to embodiments of the present disclosure. The operation event will be described in detail with reference to FIGS. 4, 5, 6, and 7.

The first tracking module 220 may process an operation associated with tracking the state of a user in response to the operation event. For example, the first tracking module 220 processes an iris scanning process in response to the operation event, and may measure the state of an eye based on an iris scan result. The first tracking module 220 may generate state information (fatigue rate) based on the tracking of the state of the user. According to an embodiment of the present disclosure, the first tracking module 220 may compare the iris scan result and predetermined reference data, and obtain state information corresponding thereto.

The second tracking module 230 may operate with the first tracking module 220 in parallel or sequentially. The second tracking module 230 may process an operation associated with tracking various states of the electronic device 100 in response to the operation event. For example, the second tracking module 230 may measure various contexts of the electronic device 100 (e.g., usage time, operation state, and ambient environment of the electronic device 100, and the like), based on the context recognition technology. The second tracking module 230 may generate at least one context information based on tracking of the state of the electronic device 100. The second tracking module 230 may obtain the context information based on at least some of the operation information, the usage information, and the ambient environment information of the electronic device 100.

The second tracking module 230 may include a usage state detecting module 231, an operation state detecting module 233, and an ambient environment detecting module 235.

The usage state detecting module 231 may detect a usage time or a cumulative usage state of the electronic device 100 or an application currently executed by the user.

The operation state detecting module 233 may detect a property (e.g., video, game, web, message, and the like) of an application that is currently executed in the electronic device 100 or that is requested to execute by the user.

The ambient environment detecting module 235 may detect an ambient environment (e.g., day, night, illuminance, lighting, weather, location (inside/outside), and the like) where the electronic device 100 is used.

The calculating module 240 may calculate the fatigue rate of the user, based on a tracking result (e.g., state information or context information) of the first tracking module 220 and the second tracking module 230. The calculating module 240 may calculate adjustment information (e.g., variables for setting options) for changing a screen option based on the tracking result.

According to embodiments of the present disclosure, the output processor 183 may include a variable setting module 250 and a result outputting module 260.

The variable setting module 250 may change the variables of a currently set screen option into variables corresponding to the adjustment information provided from the calculating module 240.

The result outputting module 260 may process outputting a screen corresponding to the option that is based on the variables changed by the variable setting module 250. According to embodiments of the present disclosure, the result outputting module 260 may embody a software filter corresponding to the option that is based on the changed variables on a currently displayed screen, so as to process outputting the changed screen. The result outputting module 260 may process outputting information corresponding to the fatigue rate calculated by the calculating module 240. The result outputting module 260 may execute a process to display an iris image corresponding to the fatigue rate and an alert message corresponding to the fatigue rate as various graphic elements (e.g., UI or GUI) on the screen.

Figure 3:
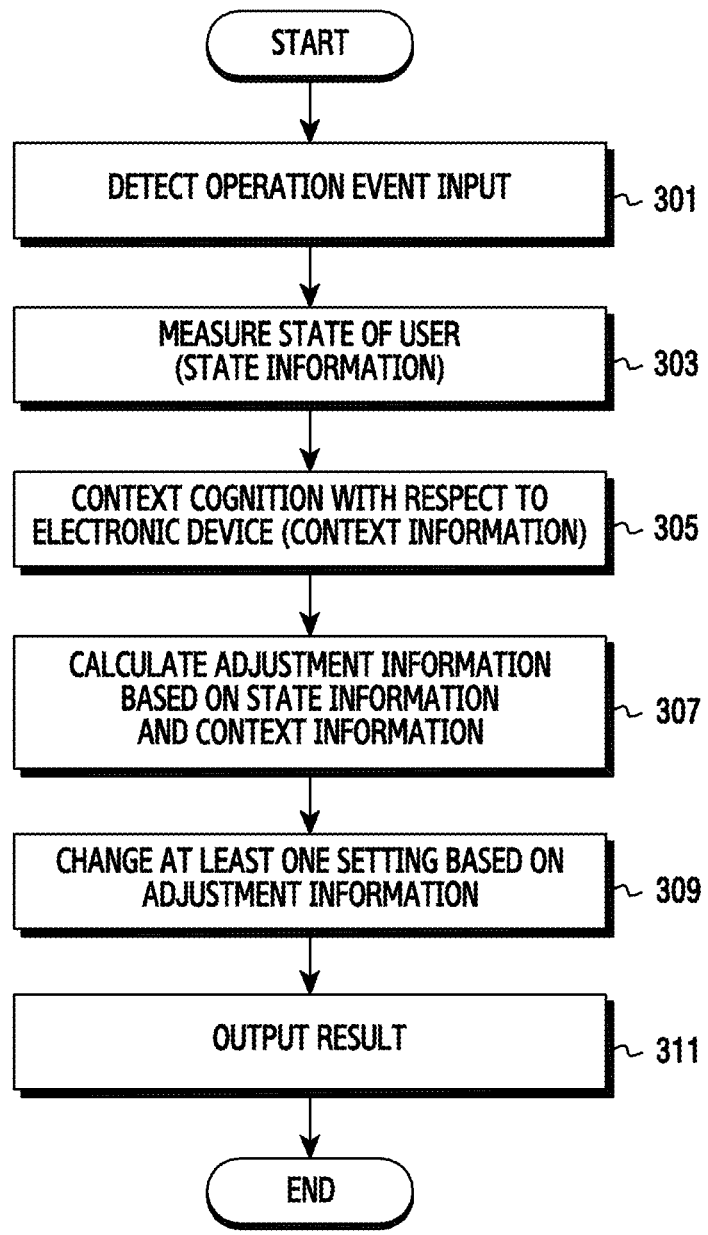
FIG. 3 is a flowchart illustrating a procedure that changes the settings of a screen in an electronic device according to an embodiment of the present disclosure.

FIG. 3 is a flowchart illustrating a procedure that changes the settings of a screen in an electronic device according to an embodiment of the present disclosure.

Referring to FIG. 3, in step 301 the controller 180 detects an input for determining the state of a user. For example, the user may input through a set interface (e.g., power button), an event for turning on the display unit 131 and to use the electronic device 100. The controller 180 may control turning on the display unit 131 in response to the event and may detect the event as an operation event for initiating a display control operation (e.g., as an operation event for determining the state of a user/electronic device 100 through state tracking). Alternatively, an iris scan may be set as a means for authenticating the user in association with various security and biometric authentication functions (e.g., lock screen, electronic payment, financial transaction, log-in, and the like). When an iris scanning operation is initiated for performing the secure function, this may be detected as the operation event. Alternatively, an eye tracking function that tracks an eye of the user while an application is executed may be set for the electronic device 100, and when the eye tracking function operates (e.g., operates based on a set period, set condition, and the like), the controller 180 may detect the same as the operation event.

In step 303, when the operation event input is detected, the controller 180 automatically measures or determines the state of the user, and may obtain state information. For example, the controller 180 may selectively control the turning-on of the camera module 170 (e.g., front camera) in response to the operation event and may process eye-tracking and iris scanning through the camera module 170.

The controller 180 may determine the state of the user's eye (e.g., degree of bloodshot eyes and the like) from an image of the user's eye recognized through the iris scanning, and may obtain the state information (e.g., fatigue rate of eye) from the determined result.

In step 305, the controller 180 obtains context information by context recognition with respect to the electronic device 100. For example, the controller 180 may determine the state by tracking various contexts (e.g., current state, cumulative user state, usage environment, and the like) of the electronic device 100 based on the context recognition technology and may obtain context information corresponding to one or more contexts through context recognition. According to embodiments of the present disclosure, the context information may include operation information of the electronic device 100 (e.g., the property (video, game, web, messenger, and the like) of an application that is currently executed or that is requested to operate), usage information of the electronic device 100 (e.g., usage time of the electronic device 100, an application, and the like), ambient environment information where the electronic device 100 is used (e.g., day, night, illuminance, lighting, weather, location (inside/outside)), and the like.

In step 307, the controller 180 calculates adjustment information for setting a screen, based on the state information and the context information. For example, the controller 180 may calculate the adjustment information (e.g., variable for each option for setting a screen) for setting at least some of the options, such as Hue Saturation Value (HSV), Hue Saturation Brightness (HSB), blue light, a resolution, and the like, based on the multiple elements of the state information and the context information.

The controller 180 may determine whether to use a first scheme (e.g., batch application) that applies the adjustment information to the entire screen or to use a second scheme (e.g., application by distinguishing) that applies the adjustment information by distinguishing displayed objects, content, or screen areas, when the adjustment information is calculated. According to an embodiment of the present disclosure, the controller 180 may determine the first scheme or the second scheme based on the user settings, or may determine the first scheme or the second scheme based on a type of application executed in the electronic device 100 or a form of a screen displayed (e.g., type of object (text, image, and the like), a property of the content, the number of distinguished areas), of the context information.

In step 309, the controller 180 changes at least one of the screen settings of the electronic device 100 based on the adjustment information. For example, the controller 180 may change at least one option setting that is required to be adjusted based on the adjustment information.

In step 311, the controller 180 output a changed result. For example, the controller 180 may change at least one option setting, and may control outputting a screen corresponding to the changed option setting. The controller 180 may provide output information associated with the state of the user (e.g., fatigue information), which is determined based on at least some of the state information and the context information sequentially or in parallel with outputting the screen corresponding to the option setting.

FIGS. 4, 5, 6, and 7 are diagrams illustrating an operation that initiates tracking the state of a user in an electronic device according to an embodiment of the present disclosure.

The initiation of state tracking that measures the state of a user (e.g., the state of user's eyes) may be executed based on an operation event in which the user operates the electronic device 100, an operation event that executes a function associated with eye-tracking while the electronic device 100 operates, an operation event that is operated based on a set period while the electronic device 100 operates, an operation event that changes an application that is currently executed in the electronic device 100, and an operation event that operates based on a change in an environment where the electronic device 100 is used (e.g., inside->outside, day->night, low illuminance->high illuminance, and the like).

Figure 4:
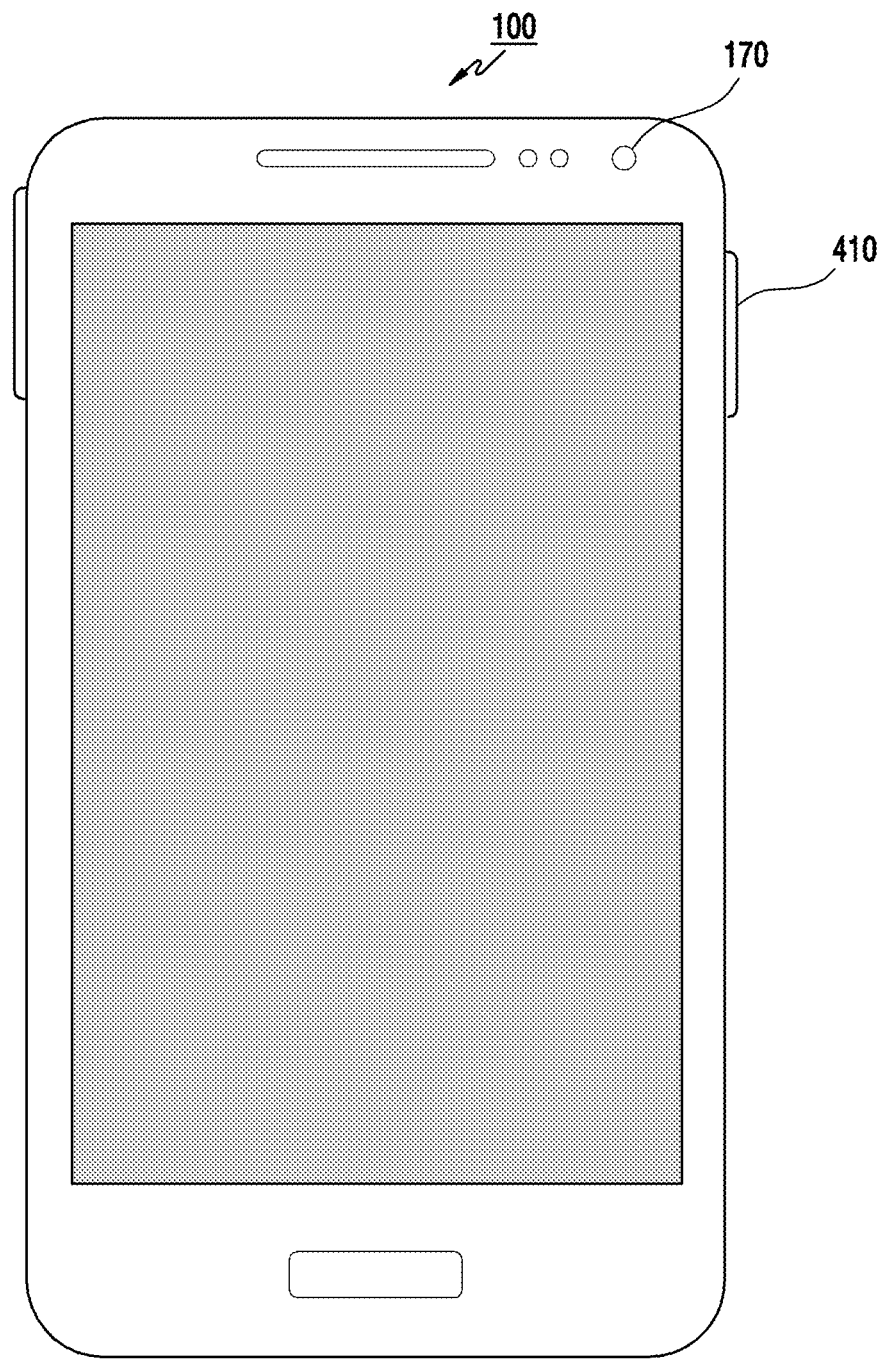
FIGS. 4, 5, 6, and 7 are diagrams illustrating an operation that initiates tracking a state of a user in an electronic device according to an embodiment of the present disclosure.

According to an embodiment of the present disclosure, as illustrated in FIG. 4, the display unit 131 of the electronic device 100 is turned off and the user may input an operation event using an interface (e.g., power button 410) set for turning on the display unit 131. The controller 180 may control the turning-on of the display unit 131, in response to the operation event input using the power button 410. The controller 180 may control the display unit 131 and control the turning-on of the camera module 170 (e.g., front camera), and may execute tracking (e.g., eye-tracking or iris scanning) the state of the user based on the data from the camera module 170.

Figure 5:
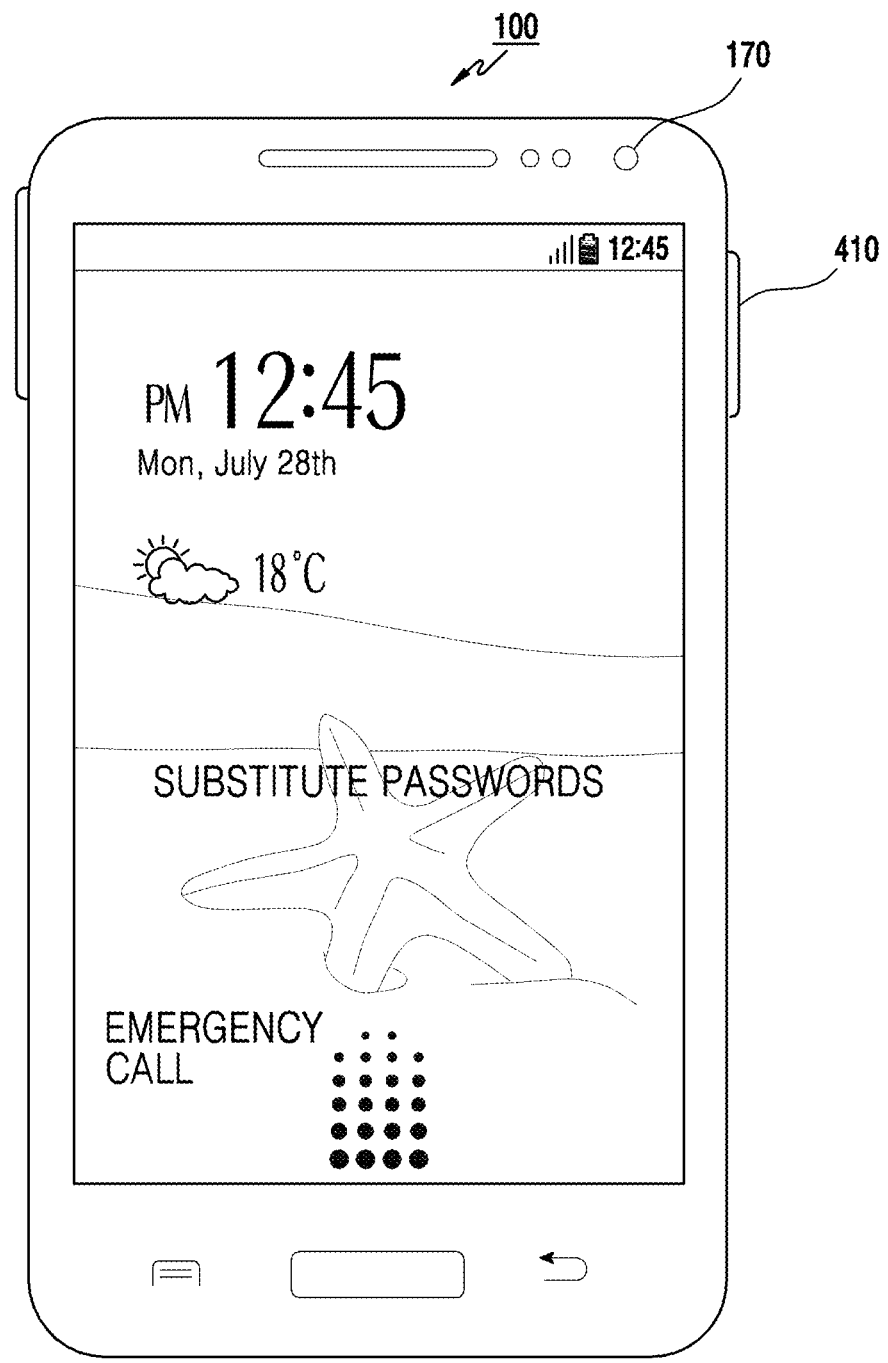

According to an embodiment of the present disclosure, as illustrated in FIG. 5, when a lock screen of the electronic device 100 is provided, and an authenticating method for releasing the lock screen is iris scanning, the user may execute a process (operation event) for scanning the iris of the user through the camera module 170 (e.g., front camera). The controller 180 may process state tracking with respect to the user in response to the operation event that executes the iris scanning process for releasing the lock screen. The controller 180 may execute state tracking with respect to the user sequentially or in parallel with the iris scanning process.

Figure 6:
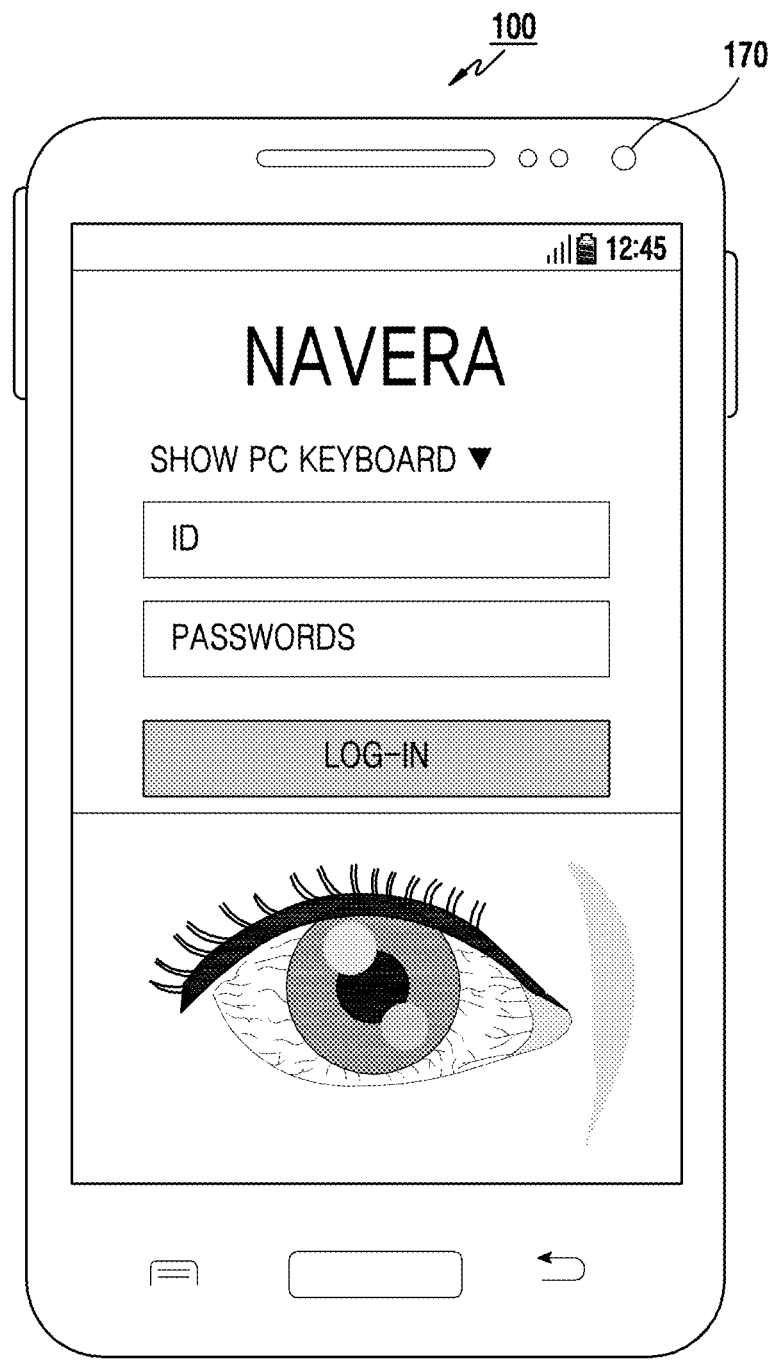

According to an embodiment of the present disclosure, there may be provided an example of an operation when the user executes user authentication (e.g., log-in, electronic payment, and the like) in a website using iris scanning, as illustrated in FIG. 6. According to embodiments of the present disclosure, when the user executes user authentication through iris scanning using the camera module 170 (e.g., front camera), various graphic elements (UI or GUI) associated with executing an iris scanning process may be provided in a part (e.g., bottom of a screen) of a currently displayed website screen. The controller 180 may process state tracking with respect to the user in response to the operation event that executes a user authentication process using iris scanning, while the electronic device 100 operates. The controller 180 may execute state tracking with respect to the user sequentially or in parallel with the user authentication process.

Figure 7:
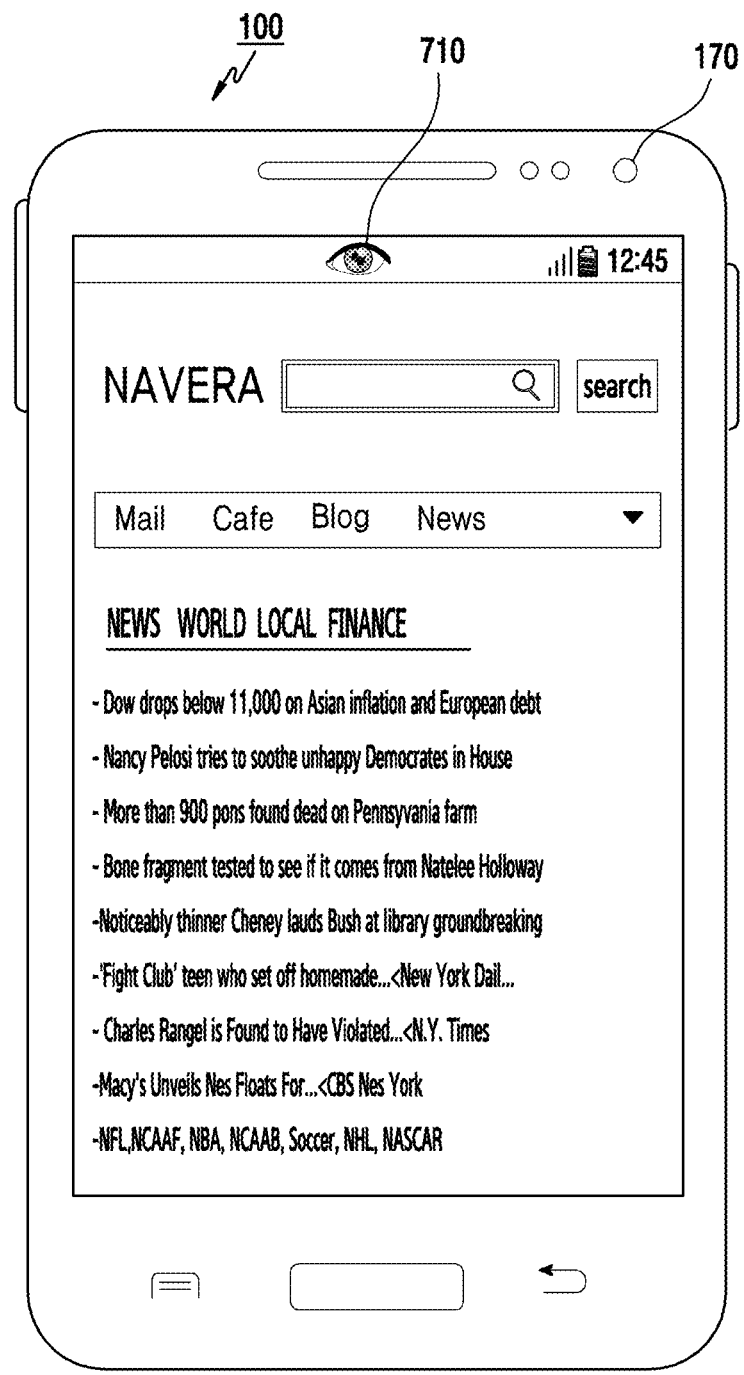

According to an embodiment of the present disclosure, as illustrated in FIG. 7, a function that pauses the operation state of the electronic device 100 through eye-tracking, a function of not turning off but maintaining a screen by determining whether the face of the user is toward the screen (e.g., smart stay), and the like may be set by the user with respect to the electronic device 100. The pause function, the smart stay function, and the like may be set in advance by the user, and may be executed by activating the camera module 170 (e.g., front camera) based on a period set in the electronic device 100. When at least one of the functions is set in the electronic device 100, the controller 180 may recognize the state of the user while the electronic device 100 operates, and process state tracking with respect to the user in response to an operation event which executes the function. The controller 180 may execute state tracking with respect to the user sequentially or in parallel with processing the function. The controller 180 may provide a related item (e.g., eye-shaped icon 710) indicating that a function is executed when the function is executed, in a part of the display unit 131 (e.g., status bar or notification bar).

According to an embodiment of the present disclosure, the electronic device 100 may be set by the user to generate an operation event based on a predetermined period (e.g., 5, 10, 20 minutes, and the like). The controller 180 may check the predetermined period when the electronic device 100 operates and when the predetermined period starts, the controller 180 recognizes the same as an operation event and processes state tracking with respect to the user.

The user may set an intended input that intends to process state tracking, and when the intended input is detected, the controller 180 recognizes the same as an operation event, and processes state tracking with respect to the user. The intended input may include a button input, a menu selecting input, a touch (or gesture) input, a motion control input of the electronic device 100, an air gesture input of the electronic device 100, an application execution input, and the like.

FIG. 8 is a diagram illustrating an example of a setting menu provided in an electronic device according to embodiments of the present disclosure.

Referring to FIG. 8, FIG. 8 illustrates an example of various options for setting a screen supported by the electronic device 100 of the present disclosure.

According to an embodiment of the present disclosure, various attributes may be included in association with screen settings, such as brightness 810, a screen mode 820, a resolution 830, blue light 840, automatic adjustment 850, and the like. The brightness option 810 may set items, such as 'color', 'chroma', 'brightness', 'automatic adjustment', and the like. The screen mode option 820 may set items, such as 'screen optimization', 'clear screen', 'standard screen', 'picture-dedicated screen', 'movie-dedicated screen', and the like. The resolution option 830 may set items, such as 'high', 'medium', 'low', 'automatic adjustment', and the like. The blue light option 840 may set items, such as 'cutoff', 'low', 'medium', 'high', and the like. The automatic adjustment option 850 may set items, such as 'activate/deactivate (e.g., On/Off)', 'register (e.g., standard, data 1, data 2, data 3, and the like)', 'distinguish (e.g., whole, area, object, and the like)', 'device (e.g., operation, usage, environment, and the like)', 'display (e.g., activate/deactivate, pop-up, status bar, whole, and the like)', and the like.

The automatic adjustment option 850 may be an option that executes state tracking with respect to the user, and automatically adjusts various options associated with screen settings (e.g., brightness 810, screen mode 820, resolution 830, blue light 840, and the like).

The automatic adjustment option 850 may set, through the activation/deactivate item, whether to execute an operation that automatically changes and sets a screen option based on the tracked state of the user.

The 'register' item may be an item that generates and registers one or more pieces of reference data (e.g., iris information (user iris image)) which are required for tracking the state of the user. For example, the 'register' item is an item for registering and storing reference data (e.g., iris information) in the electronic device 100 when the function is used that automatically changes and sets the screen settings based on the state of the user. One or more pieces of reference data may be registered. The electronic device 100 may process an image obtained through iris scanning using the camera module 170 (e.g., front camera), an iris recognizing sensor, and the like, and may store processed images (e.g., at least one iris (or iris image) registered by the user).

The user may register standard, data 1, data 2, data 3, and the like in association with the reference data (e.g., iris image) recognized by the operation of scanning the iris. According to embodiments of the present disclosure, the standard may indicate that the eyes of the user are in a favorable state (e.g., a normal state without fatigue or a fatigue rate that is less than or equal to a set threshold fatigue rate), and the data 1, data 2, and data 3 are registered by variously distinguishing the fatigue rate of the eyes of the user (e.g., the degree of bloodshot eyes). One or more of the standard, data 1, data 2, or data 3 may be registered. The reference data in association with the standard, data 1, data 2, or data 3 may be directly registered through iris scanning of the eye of the user, may be registered by being received from an external electronic device (e.g., another electronic device or external server), or may be provided from the electronic device 100 based on fatigue rate-based statistical data.

The 'distinguish' item indicates an item for setting a scheme of displaying a screen based on a set option that is changed based on the state of the user. For example, when 'whole' is selected in the 'distinguish' item, the changed option is applied to the entire screen. When 'property' is selected in the 'distinguish' item, the changed option is differently applied by distinguishing the property (e.g., video, text, images, and the like) of content displayed in the screen. When 'object' is selected in the 'distinguish' item, the changed option is differently applied by distinguishing objects displayed in the screen.

The 'device' item indicates an item for setting another element in association with tracking the state of the user. For example, 'usage' in the 'device' item may be selected in the case where a time (e.g., game time, an application usage time, and the like) when the user uses the electronic device 100 is reflected to state tracking with respect to the user. 'Operation' in the 'device' item may be selected when the property (video, game, web, messenger, and the like) of an application that is currently executed in the electronic device 100 or that is requested to operate at a point in time of tracking is reflected to state tracking with respect to the user. 'Environment' in the 'device' item may be selected when an ambient environment (e.g., day, night, illuminance, lighting, weather, location (inside/outside), and the like) where the electronic device 100 is used at a point in time of tracking, is reflected to state tracking with respect to the user. One or more of 'use', 'operation', and 'environment' may be set by a selection made by the user.

The 'display' item may indicate an item for setting a scheme that displays output information (e.g., measurement information or fatigue rate information) associated with the tracked state of the user (e.g., state information or context information). For example, 'activate/deactivate' in the 'display' item may set whether to execute an operation for displaying the output information. Top-up' in the 'display' item may indicate a scheme of displaying the output information based on various graphic elements (e.g., UI or GUI), such as text, images, and the like, through a popup window on the screen. 'Status bar' in the 'display' item may indicate a scheme of displaying the related information based on a notification item (e.g., text, notification icon, and the like) through a status bar (e.g., notification bar or indicator area) of the electronic device 100. 'Whole' in the 'display' item may indicate a scheme of displaying the output information based on graphic elements (e.g., UI or GUI) such as text, images, and the like, on the entire screen (e.g., switching a screen).

According to an embodiment of the present disclosure, state tracking with respect to the user may include tracking the state of the eyes of the user as described in the above example, and tracking (e.g., context recognition) various contexts (e.g., operation, usage, environment, and the like) of the electronic device 100 through context recognition with respect to the electronic device 100. When the screen settings are changed based on the state of the user, the screen settings may be changed based on a first element (e.g., state information) that takes into consideration the physical state (e.g., fatigue rate of eyes) of the user and a second element (e.g., context information) that takes into consideration the usage state and the operation state of the electronic device 100.

For example, when the state information corresponding to the standard registered in the 'register' item is obtained through tracking the state of the user (e.g., the state of bloodshot eyes), the controller 180 may execute a process to maintain the screen associated with the currently set option. The controller 180 may obtain information (e.g., adjustment information) for changing an option by obtaining the state information and context information corresponding to an element set in the 'device' item. The controller 180 may automatically change one or more options based on the adjustment information.

According to an embodiment of the present disclosure, when state information corresponding to data 1, data 2 or fatigue rate 3 registered in the 'register' item is obtained through tracking the state of the user (the state of bloodshot eyes), the controller 180 may execute a process to display a screen by variously changing the currently set option based on the corresponding state information. In the case of data 1, the controller 180 may execute a process to adjust one or more items in option 1 (e.g., brightness). In the case of data 2, the controller 180 may execute a process to adjust one or more items in option 1 (e.g., brightness) and option 4 (e.g., blue light). In the case of data 3, the controller 180 may execute a process to adjust one or more items in option 1 (e.g., brightness), option 2 (e.g., a screen mode), option 3 (e.g., resolution), and option 4 (e.g., blue light).

According to an embodiment of the present disclosure, the controller 180 may obtain first adjustment information for changing an option by obtaining the state information (e.g., standard, data 1, data, 2, and data 3), and may obtain second adjustment information of which an option is additionally changed based on context information, from the first adjustment information for changing the option, by obtaining the context information corresponding to an element set in the 'device' item. The controller 180 may execute a process to variously change the currently set operation based on the second adjustment information and to display a screen.

As described above, according to embodiments of the present disclosure, option settings may be primarily changed based on the state information corresponding to the user, and may be secondarily changed based on the context information corresponding to the electronic device 100. Alternatively, option settings may be changed by taking into consideration both the state information corresponding to the user and the context information corresponding to the electronic device 100. That is, the option settings may be changed by sequentially or in parallel, processing the state information and the context information, and a result of the parallel or sequential processing may show an identical result.

Figure 9:
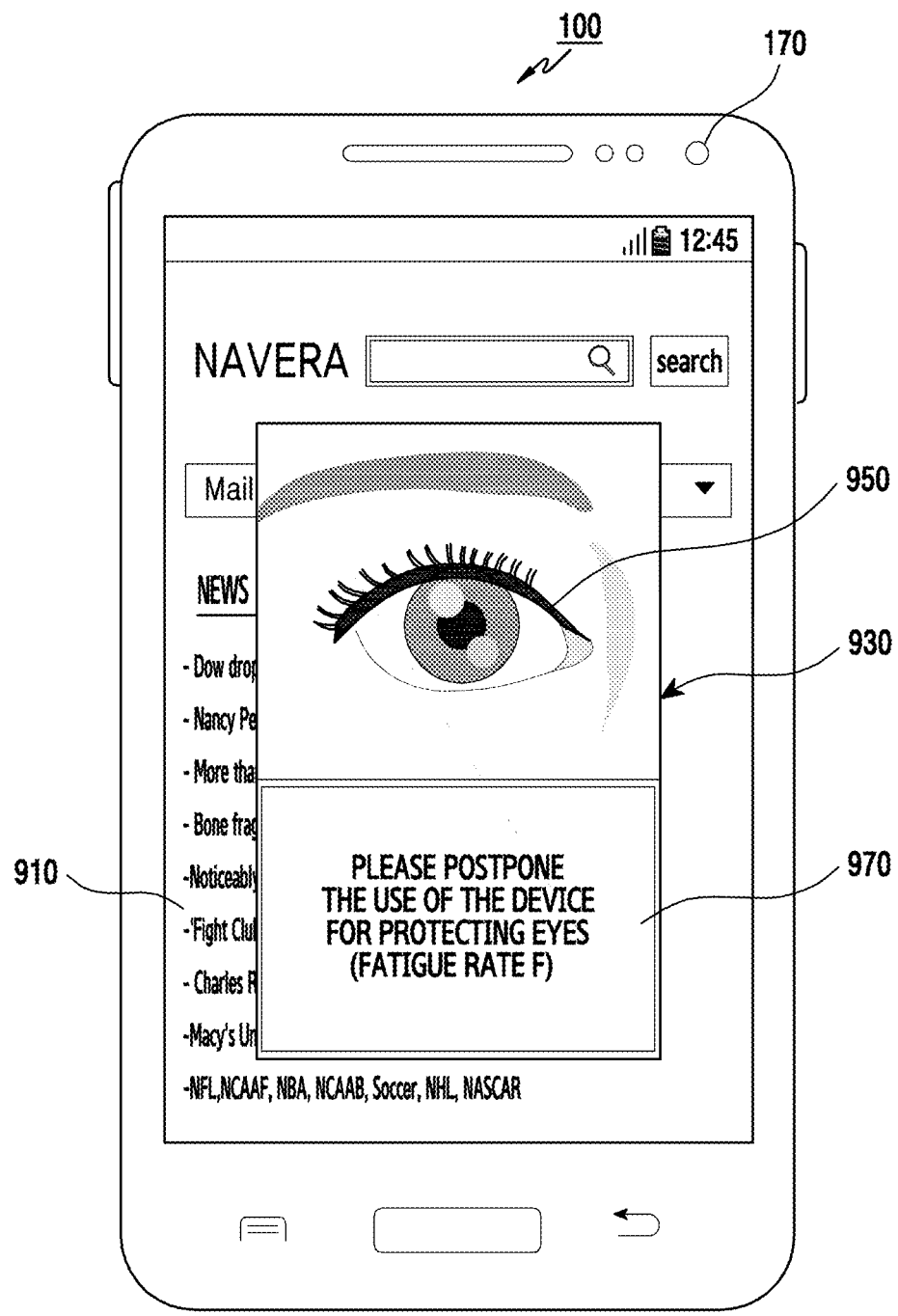
FIGS. 9, 10, and 11 are diagrams illustrating an example of outputting information associated with a user state in an electronic device according to an embodiment of the present disclosure.
Figure 10:
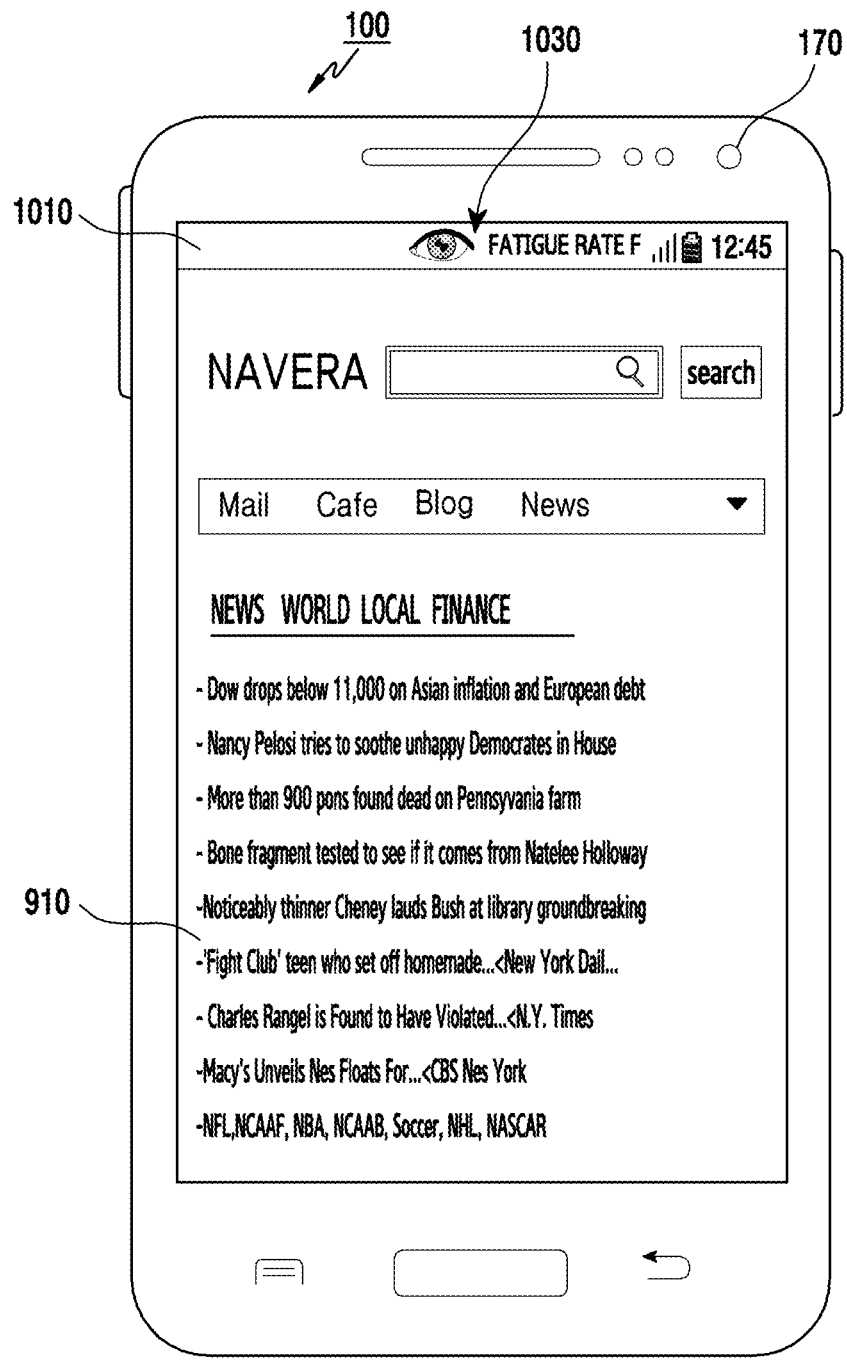
Figure 11:
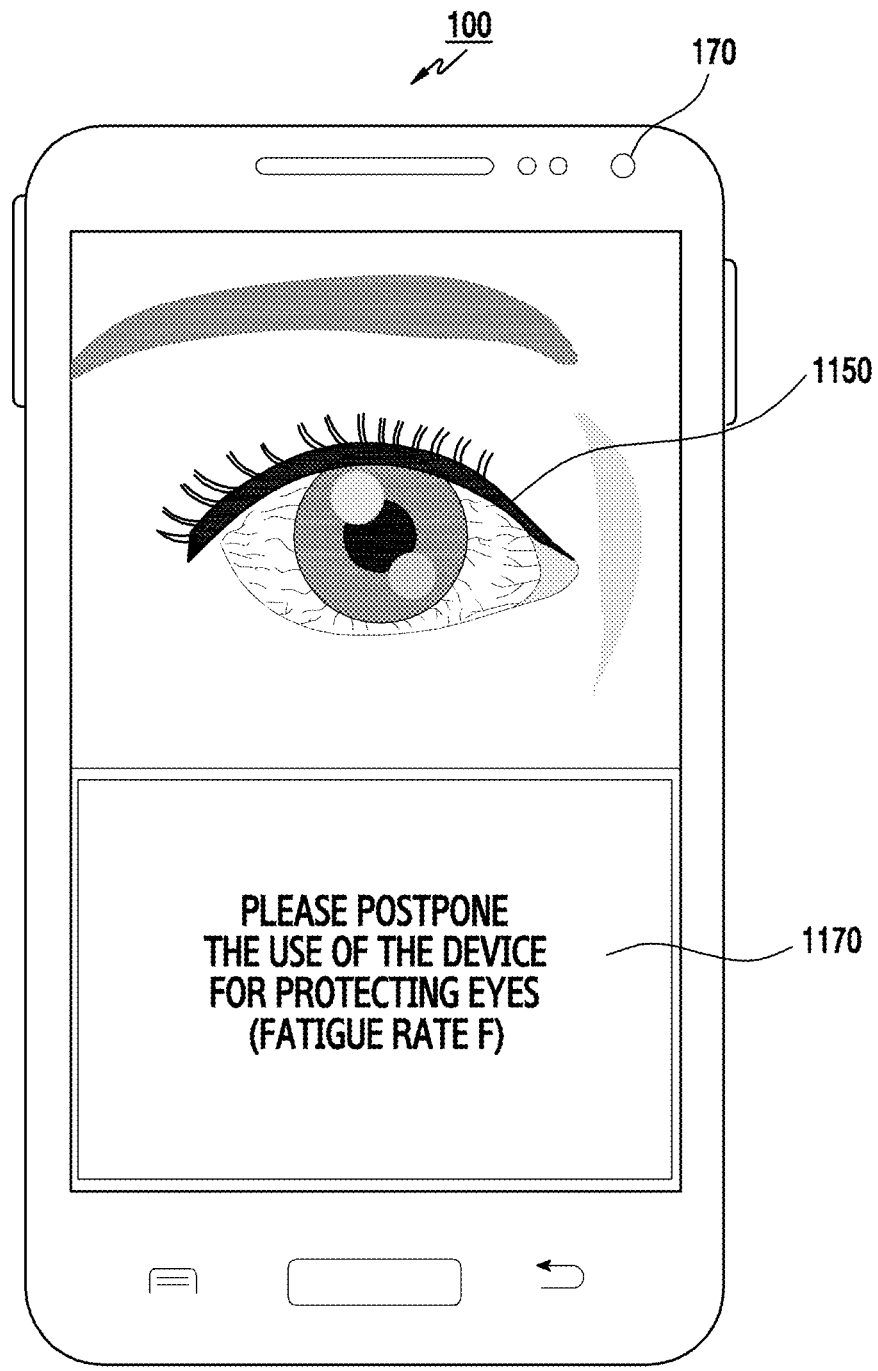

FIGS. 9, 10, and 11 are diagrams illustrating an example of outputting information associated with the state of a user in an electronic device according to an embodiment of the present disclosure.

FIGS. 9, 10, and 11 show examples of displaying the fatigue rate of a user based on tracked state information and context information by visualizing the same using various graphic elements (e.g., UI or GUI).

Referring to FIG. 9, FIG. 9 illustrates an example of a case in which output information corresponding to the fatigue rate is displayed by executing a pop-up window 930 on an execution screen 910 that is currently displayed. For example, the popup window 930 may display output information including an image 950 (e.g., eye-shaped image) corresponding to the tracked user's state information, an alert message 970 (e.g., text such as "please postpone the use of the device for protecting eyes", and an index of a fatigue rate (e.g., fatigue rate F)). According to embodiments of the present disclosure, the output information (e.g., image 950 or alert message 970) may be variously provided based on the tracked user state. According to an embodiment of the present disclosure, the degree of bloodshot eyes is displayed to be different in the eye-shaped image 950, based on the state of the bloodshot eyes, and the alert message 970 is provided to be different based on the same state. In addition, the eye-shaped image 950 may be provided by including information associated with a change in the size of pupil.

Referring to FIG. 10, FIG. 10 illustrates an example of a case that maintains the currently displayed screen 910, and displays output information corresponding to the fatigue rate, in a part (e.g., a status bar 1010) of the display unit 131. For example, the status bar 1010 displays output information based on a notification item 1030 corresponding to the tracked user's state information. The status bar 1010 may display a notification item including an eye-shaped image (or icon) and a message (e.g., fatigue rate index, fatigue rate F) which correspond to the tracked user state. According to an embodiment of the present disclosure, it is assumed that the fatigue rate of user's eyes is distinguished from level A to level G, and the fatigue rate becomes higher as the level becomes closer to level G. According to embodiments of the present disclosure, the notification item (e.g., eye-shaped image or fatigue rate index) may be variously provided based on the tracked user state.

According to an embodiment of the present disclosure, when the user selects (e.g., touch, drag, sweep/flick, and the like) the notification item 1030 from the status bar 1010, output information may be displayed through a popup window based on a scheme set in the electronic device 100 as illustrated in FIG. 9, or output information may be displayed on the entire screen as illustrated in FIG. 11.

Referring to FIG. 11, FIG. 11 illustrates an example of a case in which output information corresponding to the fatigue rate on the entire screen (e.g., switching a screen). For example, output information including an image 1150 (e.g., eye-shaped image) corresponding to the tracked user's state information, an alert message (e.g., text such as "please postpone the use of the device for protecting eyes", and a fatigue rate index (e.g., fatigue rate F), and the like) may be displayed on the entire screen through switching a screen.

According to an embodiment of the present disclosure, when output information corresponding to the example of FIG. 9, FIG. 10, or FIG. 11 is provided, the output information may be displayed based on a screen option changed to correspond to the user state.

FIGS. 12, 13, 14, and 15 are diagrams illustrating an example of an outputting operation when a change is made in the settings of a screen in an electronic device according to embodiments of the present disclosure.

FIGS. 12, 13, 14, and 15 are diagrams illustrating a process that displays a screen by changing screen settings based on adjustment information obtained based on a result of tracking the state of user's eyes (e.g., state information) and a result of tracking the state of the electronic device 100 (e.g., context information).

The fatigue rate of the eyes of the user that view the electronic device 100 may rapidly increase as the time that the user spends with the electronic device 100 increases. According to an embodiment of the present disclosure, the fatigue rate of the user may be determined based on the various measurements such as a pupil dilatation/contraction state measurement (e.g., a change in the size of pupil), a bloodshot-eye state measurement (e.g., a change in the state of bloodshot eyes) executed based on an RGB value (e.g., red value), an eye state measurement (e.g., degree of shine) executed based on the shine of eyes, a measurement of the state of heat around the eyes, an eye state measurement based on a change in the tissue of the eyes, and the like. The electronic device 100 may determine the fatigue rate of user's eyes based on at least some of the eye state tracking information (e.g., state information) associated with the size of pupil, the state of bloodshot eyes, and the like, and tracking information (e.g., context information) associated with the usage state of the electronic device 100.

Figure 12:
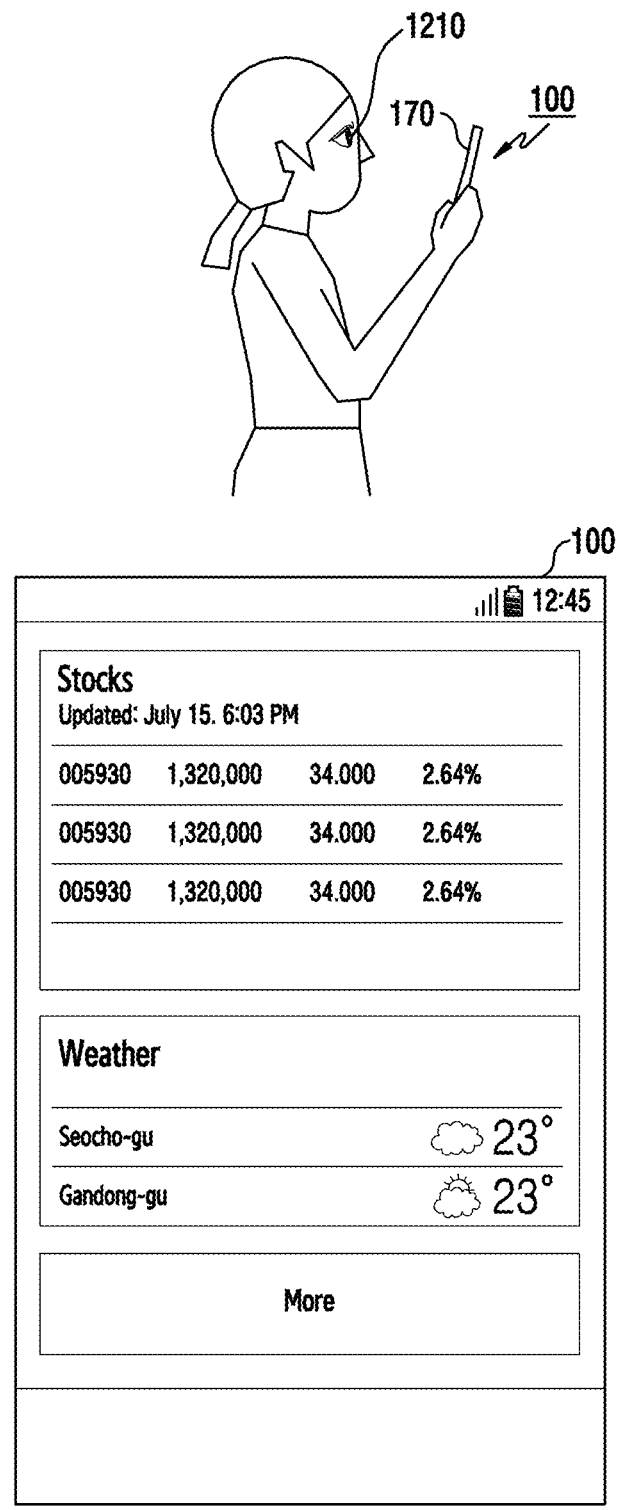
FIGS. 12, 13, 14, and 15 are diagrams illustrating an example of an outputting operation when a change is made in the settings of a screen in an electronic device according to an embodiment of the present disclosure.

Referring to FIG. 12, FIG. 12 illustrates an example in which the electronic device 100 executes an operation (function) corresponding to a user input, and displays a related screen. The electronic device 100 may initiate state tracking that measures the state of the user (e.g., the state of eyes 1210) in response to the user input (e.g., operation event). For example, as illustrated in FIG. 12, when the sight line of the user views a screen that is currently displayed in the electronic device 100 and the electronic device 100 photographs the user's eye 1210 through the camera module 170 (e.g., front camera) based on the eye-tracking technology. The electronic device 100 obtains state information based on the photographed user's eye image (e.g., iris image) and predetermined reference data, and may obtain context information corresponding to the usage time, operation state, ambient environment of the electronic device 100, and the like, based on the context recognition technology.

The electronic device 100 may obtain (calculate) adjustment information based on the state information and the context information, and may display a screen by changing the settings of a screen option in real time based on the obtained adjustment information. FIG. 12 illustrates a time point when the electronic device 100 initiates operations (e.g., a time point when the user begins to use the electronic device 100), and the tracked user's state is favorable (e.g., no fatigue rate). According to an embodiment of the present disclosure, when it is determined that the user's fatigue rate does not exist as illustrated in FIG. 12, displaying a screen may be processed based on a screen option set in advance (or currently) in the electronic device 100. For example, a screen that is displayed when the electronic device 100 begins operations, may be maintained and provided. Alternatively, a screen may be displayed by changing a screen option to correspond to the tracked user's state in real time.

Figure 13:
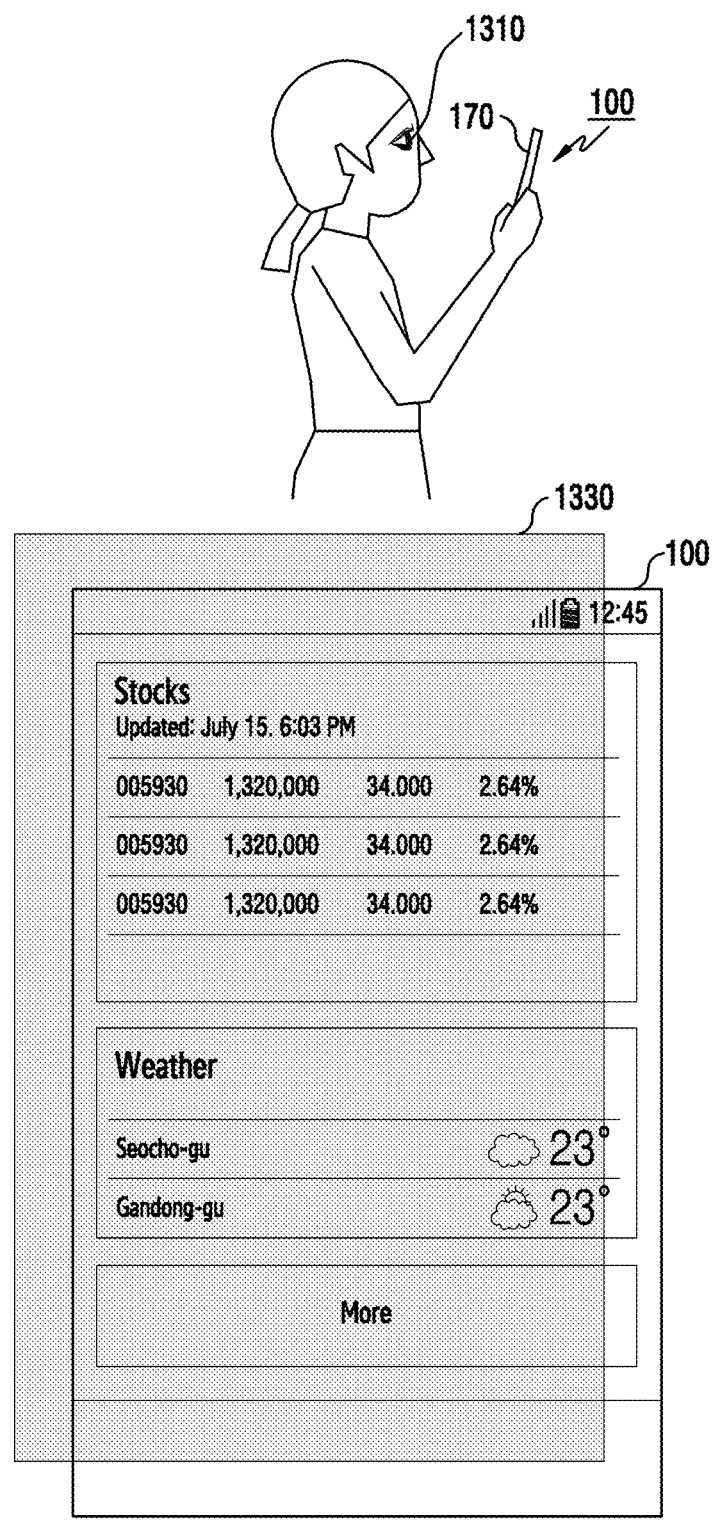

Referring to FIG. 13, FIG. 13 illustrates an example of a case where a user uses the electronic device 100 more than a predetermined period of time under the state of FIG. 12, and a set operation event is detected. The electronic device 100 may initiate state tracking (e.g., state of eye 1310) with respect to the user and state tracking that tracks the context of the electronic device 100, in response to the operation event. For example, as illustrated in FIG. 13, when the sight line of the user continuously views a screen that is currently displayed in the electronic device 100 and the electronic device 100 tracks the user's eye 1310 through the camera module 170 (e.g., front camera) and obtains state information. Also, the electronic device 100 may obtain context information by tracking the usage time, operation state, ambient environment, and the like in association with the electronic device 100.

The electronic device 100 may obtain adjustment information based on the state information and the context information, and may display a screen as shown in the diagram 1330, by changing the settings of a screen option in real time based on the obtained adjustment information. For example, FIG. 13 illustrates an example of a state of bloodshot eyes of the user when the electronic device 100 is used more than a predetermined period of time (e.g., N (where N is hours, minutes, and seconds units) (e.g., 10 minutes, 30 minutes, 1 hour, and the like)). Accordingly, the electronic device 100 may display a screen by changing a screen option to correspond to the adjustment information in real time. According to an embodiment of the present disclosure, as illustrated in FIG. 13, a screen may be displayed in response to the fatigue rate of the user by adjusting at least some of the screen options of the electronic device 100 (e.g., setting at least some of brightness, a screen mode, a resolution, and blue light). The electronic device 100 sets the blue light to be low, and sets a color to be decreased by a predetermined ratio in 'brightness', and displays a screen change based on the above (e.g., state of the diagram 1330).

Figure 14:
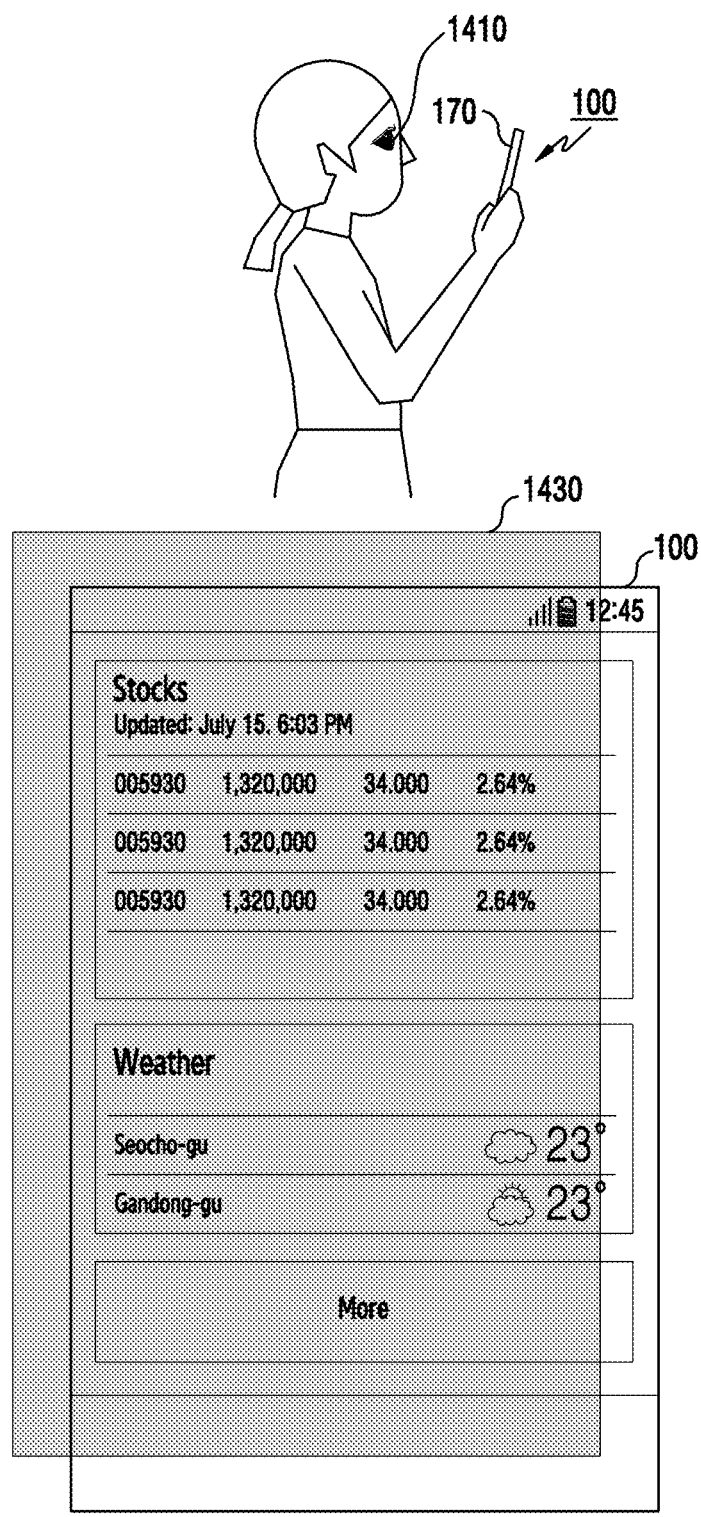

Referring to FIG. 14, FIG. 14 illustrates an example of a case where a user uses the electronic device 100 longer than the predetermined period of time of FIG. 13, under the state identical to FIG. 13, and a set operation event is detected. The electronic device 100 may initiate state tracking (e.g., state of eye 1410) with respect to the user and state tracking that tracks the context of the electronic device 100, in response to the operation event. For example, as illustrated in FIG. 14, when the sight line of the user continuously views a screen that is currently displayed in the electronic device 100, the electronic device 100 tracks the user's eye 1410 through the camera module 170 (e.g., front camera) and obtains state information. Also, the electronic device 100 may obtain context information by tracking the usage time, operation state, ambient environment, and the like.

The electronic device 100 may obtain adjustment information based on the state information and the context information, and may display a screen as shown in the diagram 1430, by changing settings of a screen option in real time based on the obtained adjustment information. For example, FIG. 14 illustrates an example of a state of a bloodshot eyes of the user when the electronic device 100 is used more than a predetermined period of time (e.g., M (where M is hours, minutes, and seconds units) (e.g., an hour and 20 minutes, 2 hours, and the like)). Here, the predetermined time, M of FIG. 14 is greater than the predetermined time, N of FIG. 13 (e.g., M>N), and the state of the bloodshot eyes of the user in FIG. 14 may be higher than the state of the bloodshot eyes of the user in FIG. 13. Accordingly, the electronic device 100 may display a screen by changing a screen option to correspond to the adjustment information in real time. According to an embodiment of the present disclosure, as illustrated in FIG. 14, a screen may be displayed in response to the fatigue rate of the user by adjusting at least some of the screen options of the electronic device 100 (e.g., at least some options from among brightness, a screen mode, a resolution, and blue light) (e.g., the number of options adjusted or an amount of change made in the options may be greater than FIG. 13). According to an embodiment of the present disclosure, the electronic device 100 sets 'cutoff' in association with blue light, sets 'color' and 'chroma' to be decreased by a predetermined ratio in 'brightness', and sets 'resolution' to be lower, and may display a screen change based on the above (e.g., state of the diagram 1430). According to an embodiment of the present disclosure, as illustrated in FIG. 14, the electronic device 100 may display a screen (a screen darker than the screen of FIG. 13) that reacts more sensitively to the fatigue rate of the user when compared to the case of FIG. 13.

According to an embodiment of the present disclosure, adjustment information for setting a screen may be calculated based on the state information and the context information. For example, the adjustment information (e.g., variable for each option for setting a screen) for setting at least some of the various options such as a HSV or HSB of a screen, blue light, a resolution, a screen mode, and the like, may be calculated based on multiple elements of the state information and context information.

Figure 15:
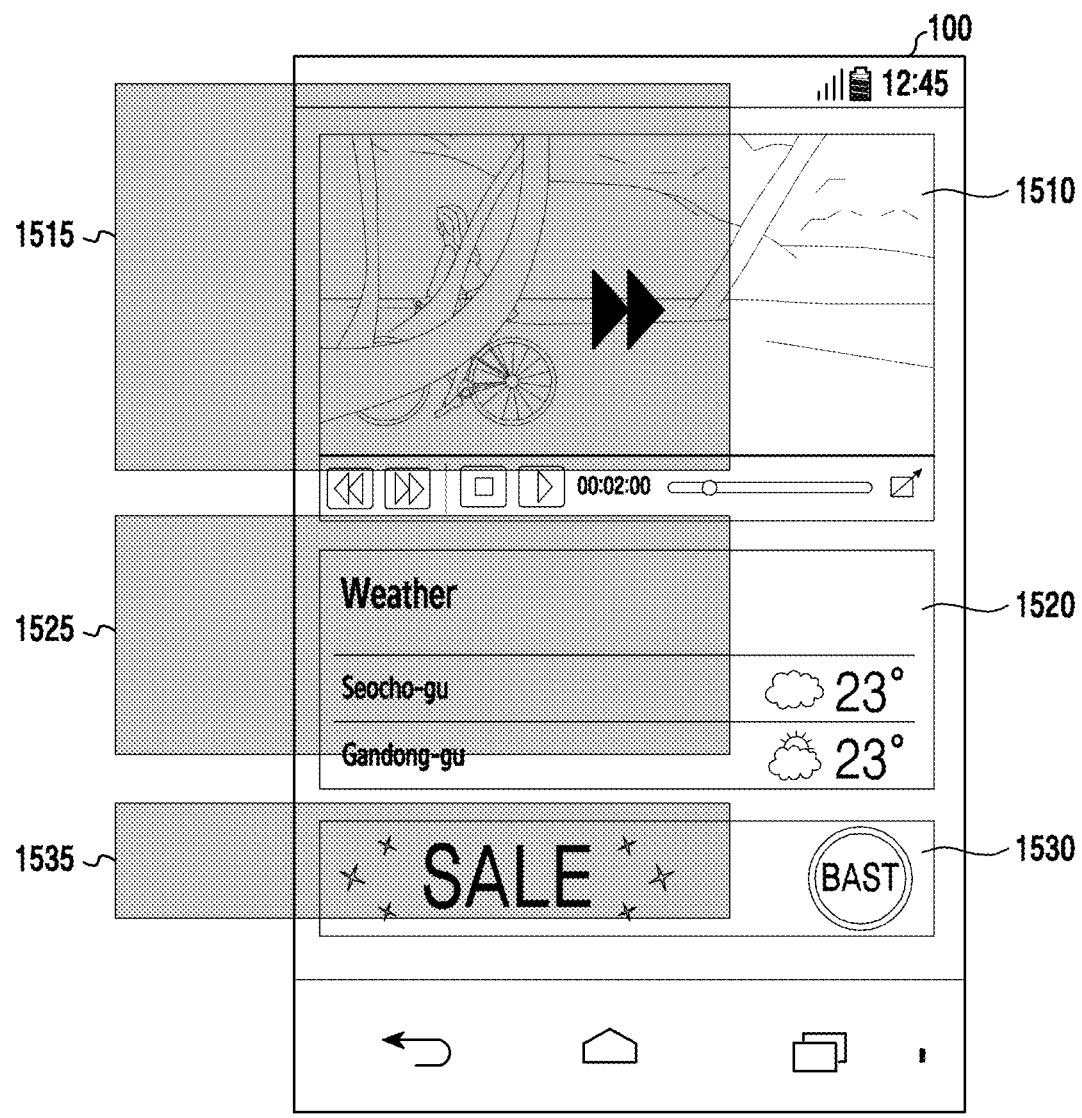

According to an embodiment of the present disclosure, a screen option that is changed based on the adjustment information may be applied to the entire screen as illustrated in FIGS. 12, 13, and 14. According to embodiments of the present disclosure, an option that is changed based on the adjustment information may be differently applied by distinguishing at least some of content, areas, or objects. FIG. 15 is an example of a case in which an option setting is applied for each content (or distinguished area).

As illustrated in FIG. 15, content 1510, 1520, and 1530 having different properties (e.g., video, text, image, and the like) may be displayed, and the electronic device 100 may selectively change and apply at least some options based on the properties of the content 1510, 1520, and 1530, in the adjustment information. As illustrated in FIG. 15, the first content 1510 (e.g., video) may be displayed as shown in the diagram 1515, by changing a setting of at least some option (first option) based on the adjustment information. The second content 1520 (e.g., text) may be displayed as shown in the diagram 1525 by changing a setting of at least some option (second option) based on the adjustment information. The third content 1530 (e.g., image) may be displayed as shown in the diagram 1535 by changing a setting of at least some option (third option) based on the adjustment information.

According to embodiments of the present disclosure the first option, the second option, and the third option, which are set to correspond to the content 1510, 1520, and 1530, may be set by selecting some or all of the adjustment information, may be set to be identical to one another, or at least a part thereof may be different. Video content may negatively affect the fatigue rate of the user more than a text content and thus, all option settings which are targeted for change may be applied to the video content based on the adjustment information, and some of the option settings which are targeted for change may be applied to the text content based on the adjustment information.

According to embodiments of the present disclosure, in addition to or instead of the content-based option setting according to the example of FIG. 15, option settings may be changed for each object. The object may include a background screen, an icon, an indicator, a pointer, an image, text, and the like displayed in the background screen, and at least one of color, brightness, visibility, and transparency of each object may be changed.

According to embodiments of the present disclosure, applying an option setting change based on the adjustment information may be embodied as at least one protective filter that may protect the user's eyes. For example, as illustrated in FIG. 13, based on the fatigue rate of the user's eye 1310, a protective filter (e.g., a filter in the form of the diagram 1330) having a bright color and a high transparency may be displayed by being superimposed on a screen. Subsequently, as illustrated in FIG. 14, based on the fatigue rate of the user's eye 1410, a protective filter (e.g., a filter in the form of the diagram 1430) having a dark color and a low transparency may be displayed by being superimposed on a screen. Switching from the filter in the form of the diagram 1330 (first filter) to the filter in the form of the diagram 1430 (second filter) may be executed in a manner that generates the second filter 1430 by additionally adjusting the first filter 1330 based on the changed fatigue rate. Alternatively, switching from the first filter 1330 to the second filter 1430 may be executed in a manner that removes the first filter 1330 and substitutes the second filter 1430.

According to embodiments of the present disclosure, applying option settings change based on the adjustment information may be embodied as a plurality of protective filters that may protect the user's eyes. For example, as illustrated in FIG. 15, based on the fatigue rate of user's eyes, protective filters (different filters in the form of diagrams 1515, 1525, and 1535) of different properties (e.g., to which different colors and different levels of darkness are applied) may be displayed by being superimposed on each of the content 1510, 1520, and 1530. In the example of FIG. 15, the protective filters 1515, 1525, and 1535 may be displayed in corresponding sizes by being superimposed on the areas corresponding to the areas in the screen where the content 1510, 1520, and 1530 are located.

According to embodiments of the present disclosure, the protective filter may be displayed by changing at least one of brightness, a screen mode, a resolution, blue light, visibility, and transparency based on the control of the controller 180 of the electronic device 100, thereby being variously embodied. The protective filter may be a component element that is generated and changed on a screen of the display unit 131 in a software manner, as opposed to a component element of a hardware manner.

As described above, according to embodiments of the present disclosure, various options of a screen or a filter (for example, intensity, brightness, blue light, and the like) are automatically adjusted based on various states that are tracked (for example, the state of a user and the state of an electronic device). When a user uses the electronic device 100 at night, the user may set the brightness of a screen to be darker than the lowest brightness of existing native settings, thereby effectively preventing glare. In the case of an electronic device (for example, an HMD) that causes the user's eyes to view a screen at a relatively short distance, the user's eyes are prevented from being badly affected by light generated from the screen.

According to embodiments of the present disclosure, the present disclosure does not adjust only a predetermined option (for example, brightness or blue light) based on a predetermined condition, such as time and the like, but automatically adjusts one or more options based on the state of a user who uses the electronic device 100, the context of an application (for example, a video (movie), Internet, a messenger, a game, and the like), a usage time for when an application or the electronic device 100 is used, an ambient environment where the electronic device 100 is used, and the like, thereby providing the user with an optimal screen. The electronic device 100 automatically informs (e.g., a fatigue rate or an alert message) a user of a bloodshot-eye state while the user uses the electronic device 100, automatically adjusts a screen option accordingly, and notifies the user of the state of the user's eyes, and thus, the electronic device 100 may have a positive effect on the user's health.

Figure 16:
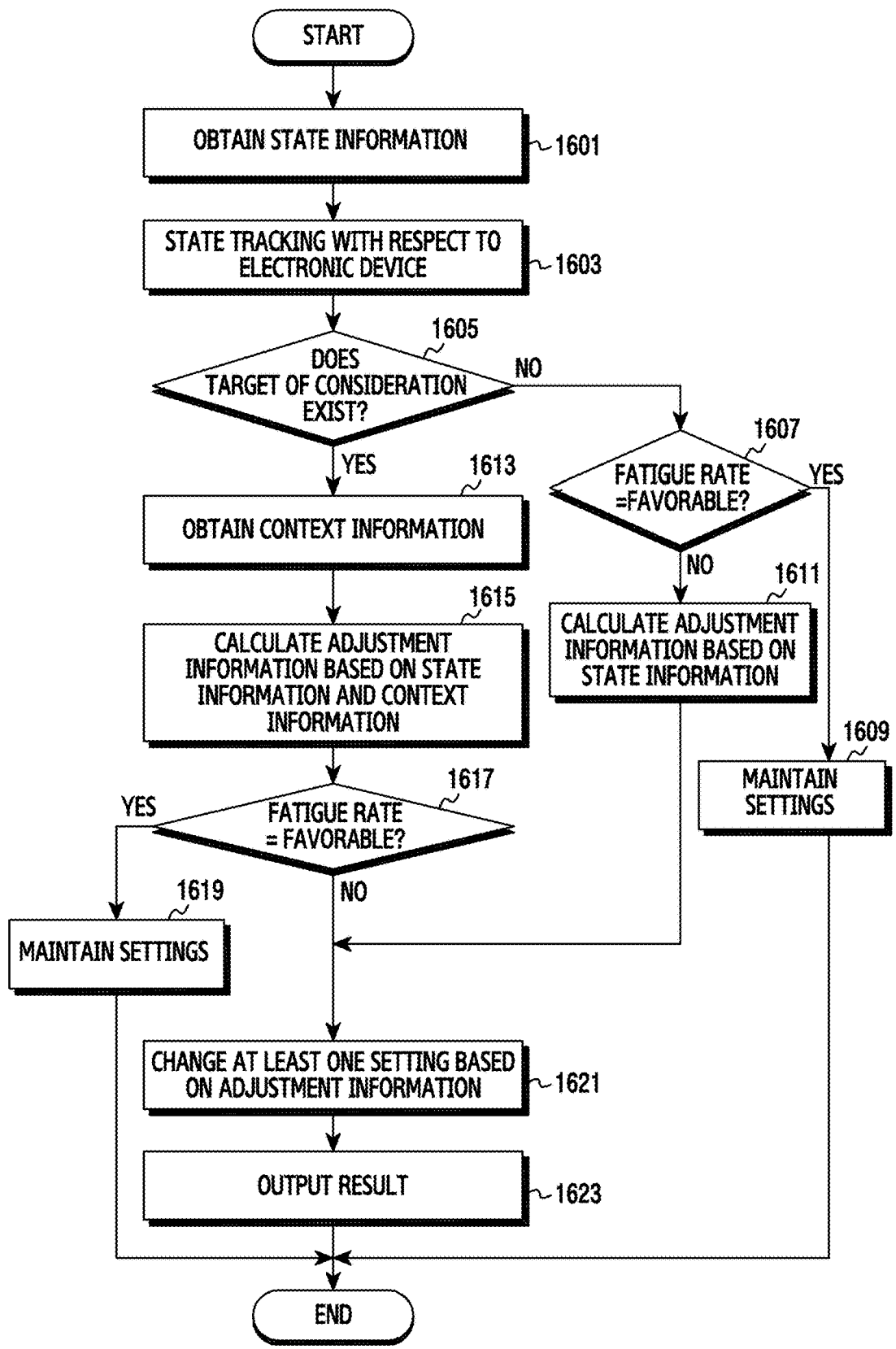
FIG. 16 is a flowchart illustrating a procedure that changes settings of a screen in an electronic device according to an embodiment of the present disclosure.

FIG. 16 is a flowchart illustrating a procedure that changes the settings of a screen in an electronic device according to an embodiment of the present disclosure.

Referring to FIG. 16, in step 1601, the controller 180 tracks the state of a user in response to an operation event as described above, and obtains state information accordingly.

In step 1603, the controller 180 tracks the state of the electronic device 100. For example, the controller 180 executes context recognition with respect to a usage time, an operation state, an ambient environment, and the like in association with the electronic device 100, sequentially or in parallel with the operation of obtaining the state information.

In step 1605, the controller 180 determines whether a target exists that is to be taken into consideration for adjustment information, in response to state tracking with respect to the electronic device 100. For example, the controller 180 may execute context recognition with respect to various elements such as a usage history, a usage time, a currently executed application, an ambient environment in association with the electronic device 100, at a point in time when state tracking is initiated. The controller 180 may determine whether a target to be taken into consideration for adjustment information exists in response to the context recognition. According to an embodiment of the present disclosure, it is determined that a target to be taken into consideration does not exist when the electronic device 100 has just begun operation, or when the user begins to use the electronic device 100 and the ambient environment is an indoor space in the afternoon on a sunny day. Conversely, when the electronic device 100 is continuously used, the controller 180 may determine that a target to be taken into consideration exists.

In step 1605, when the controller 180 determines that the target of consideration does not exist (NO in step 1605), the controller 180 determines the fatigue rate of the user based on the state information in step 1607. For example, the controller 180 may determine whether the fatigue rate of the user is favorable (e.g., less than or equal to a set fatigue rate) based on the state information which is obtained using an iris image obtained from tracking and reference data.

In step 1607, when the controller 180 determines that the fatigue rate of the user is favorable (YES in step 1607) based on the state information, the controller 180 may maintain the current settings of the electronic device 100 in step 1609. Alternatively, the controller 180 may change at least some option settings so as to enable the current settings to correspond to the state information, according to settings of the electronic device 100.

In step 1607, when the controller 180 determines that the fatigue rate of the user is not favorable (NO in step 1607) based on the state information, the controller 180 may calculate adjustment information based on the state information in step 1611. Subsequently, the controller 180 may proceed with step 1621 so as to process the following operations.

In step 1605, when the controller 180 determines that the target of consideration exists (YES in step 1605), the controller 180 obtains at least one context information corresponding to the target of consideration in step 1613. For example, the controller 180 may calculate context information from each piece of information that is obtained through context recognition with respect to a usage time, an operation state, an ambient environment, and the like in association with the electronic device 100.

In step 1615, the controller 180 calculates adjustment information based on the state information and the context information.

In step 1617, the controller 180 determines whether the fatigue rate of the user that is based on the state information and the context information is favorable (e.g., less than or equal to a set fatigue rate).

In step 1617, when the controller 180 determines that the fatigue rate of the user that is based on the state information and the context information is favorable (YES in step 1617), the controller 180 maintains the current settings of the electronic device 100 in step 1619. Alternatively, the controller 180 may change at least some option settings so as to enable the current settings to correspond to the state information and the context information, according to settings of the electronic device 100.

In step 1617, when the controller 180 determines that the fatigue rate of the user that is based on the state information and the context information is not favorable (NO in step 1617), the controller 180 changes at least one option setting based on the adjustment information in step 1621.

In step 1623, the controller 180 may output a changed result. For example, the controller 180 may change at least one option setting and may control outputting a screen corresponding to the changed option setting. Also, the controller 180 may provide output information (e.g., fatigue rate information) associated with a user state that is determined based on at least some of the state information and the context information through a set scheme (e.g., a popup outputting scheme, a status bar outputting scheme, or a batch outputting scheme), sequentially or in parallel with outputting the screen corresponding to the option setting.

Figure 17:
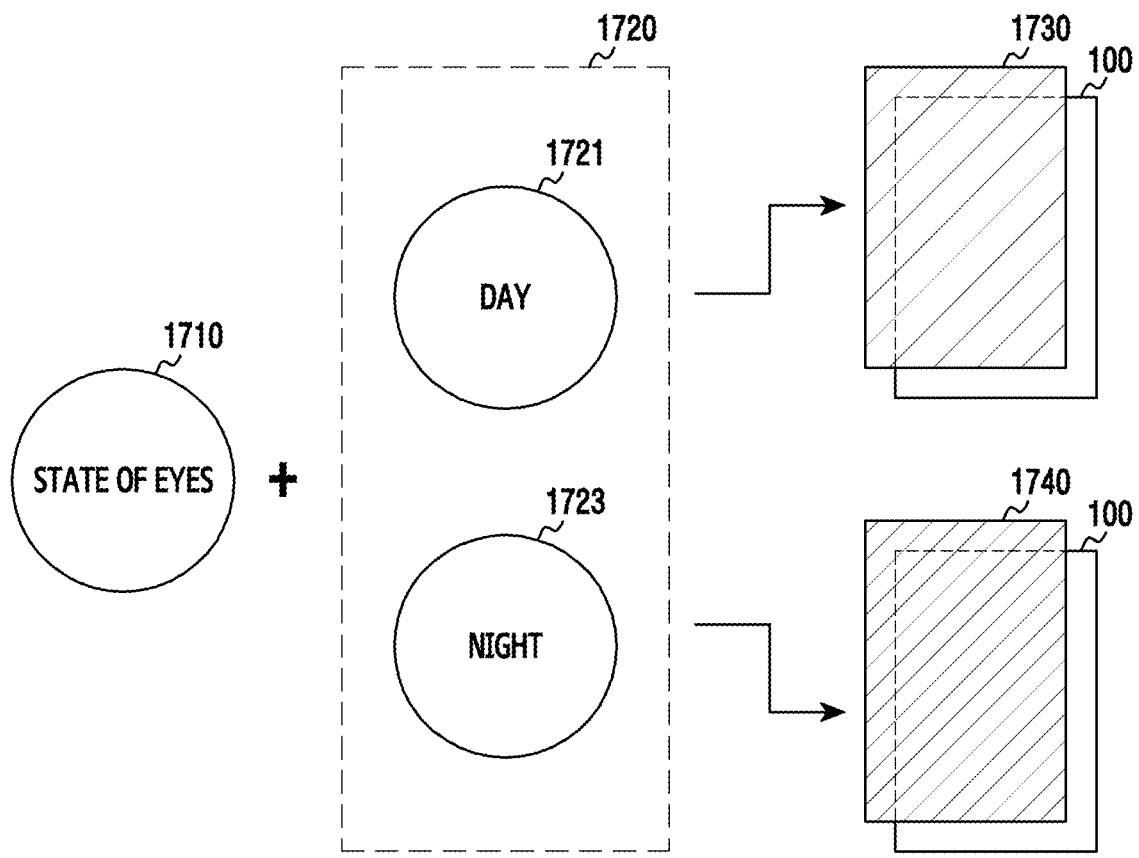
FIGS. 17, 18, and 19 are diagrams illustrating an example of an operation that changes the settings of a screen by taking into consideration various information in an electronic device according to an embodiment of the present disclosure.
Figure 18:
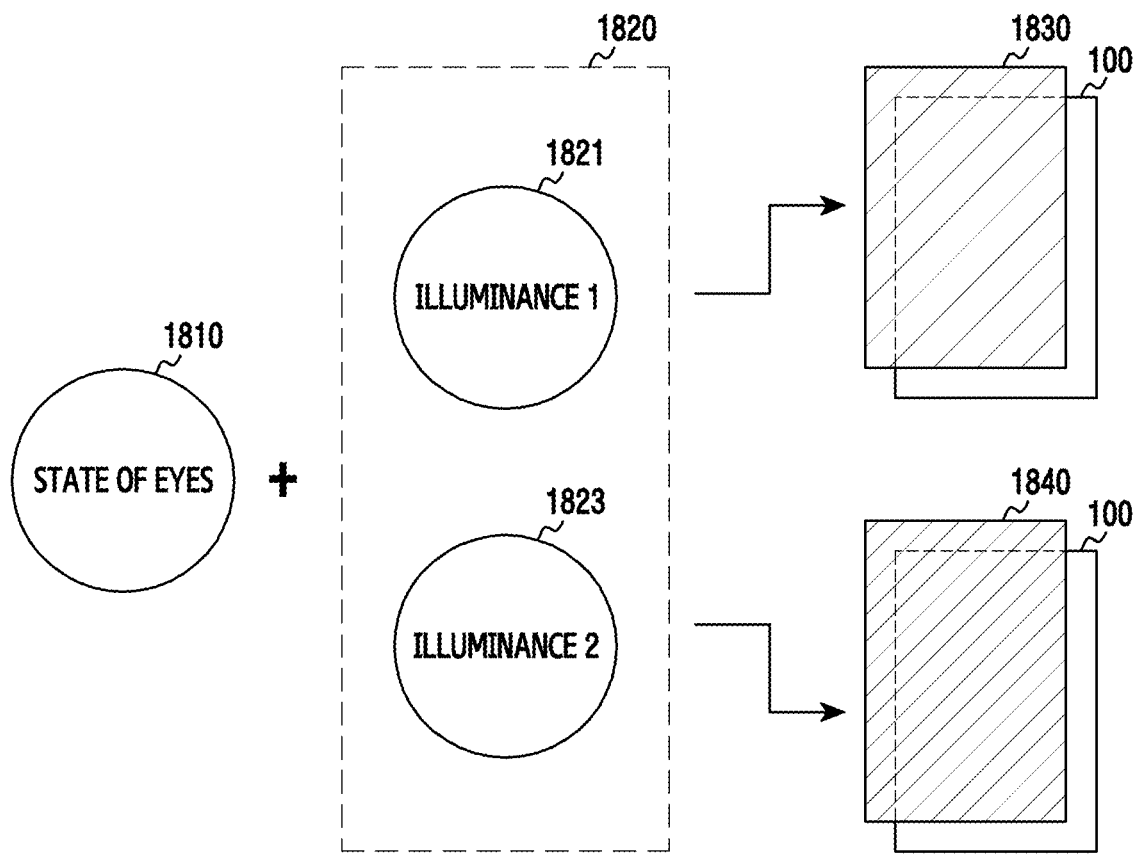
Figure 19:
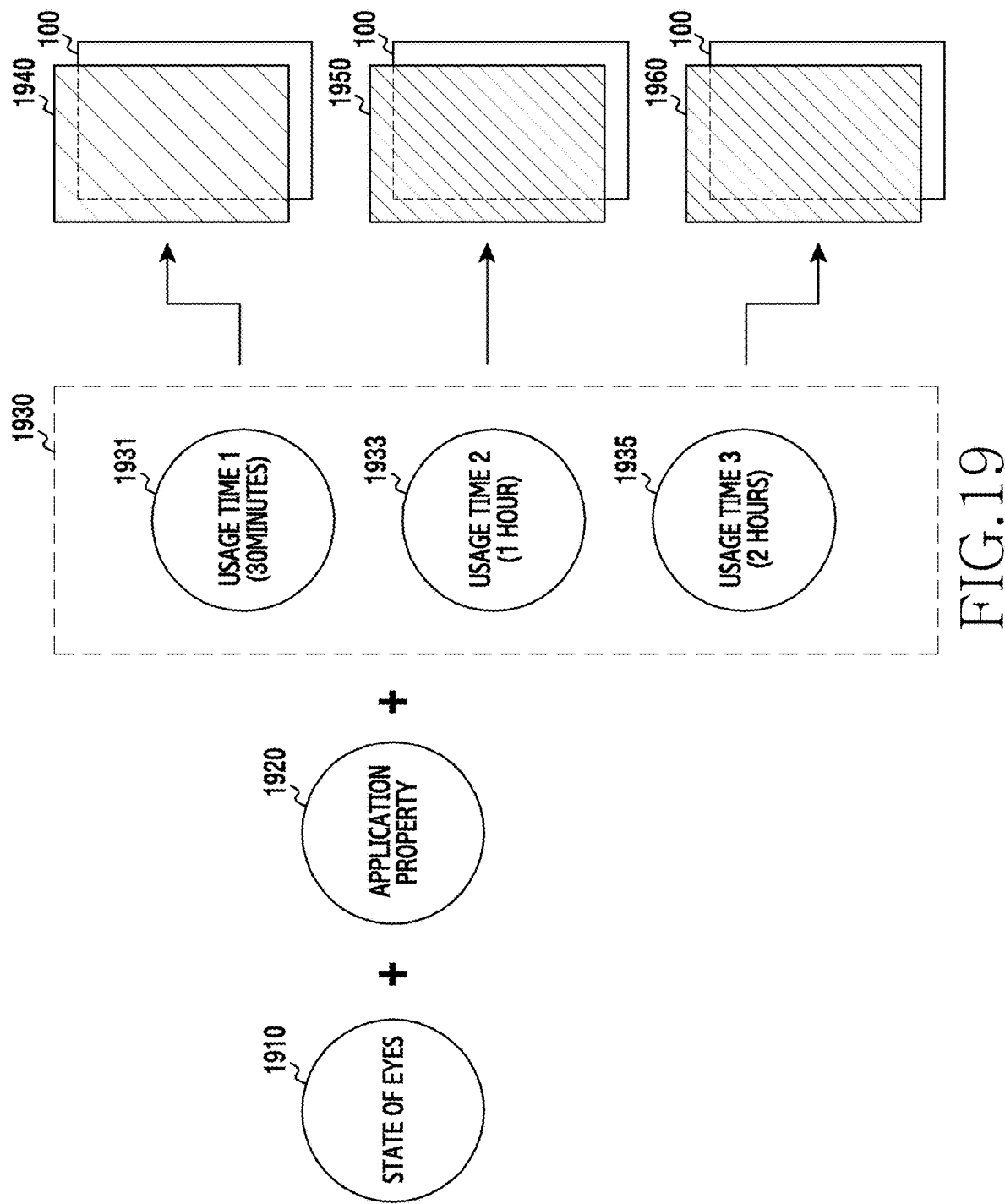

FIGS. 17, 18, and 19 are diagrams illustrating an example of an operation that changes the settings of a screen by taking into consideration various information in an electronic device according to an embodiment of the present disclosure.

As illustrated in FIGS. 17, 18, and 19, FIG. 17 illustrates an example in which a screen option is changed by taking into consideration state information and environment information (e.g., day and night) of the context information according to embodiments of the present disclosure. FIG. 18 illustrates an example in which a screen option is changed by taking into consideration state information and environment information (e.g., illuminance) of the context information according to embodiments of the present disclosure. FIG. 19 illustrates an example in which a screen option is changed by taking into consideration state information and operation information (e.g., a property of an application) of context information according to embodiments of the present disclosure.

Referring to FIG. 17, the controller 180 determines the fatigue rate of user's eyes to be different based on state information (e.g., state of eyes) 1710 obtained by tracking the state of user's eyes and environment information 1720 (e.g., day 1721 and night 1723).

For example, under the condition of an identical fatigue rate of user's eyes (e.g., identical state information), when the present time corresponds to day 1721, the controller 180 may adjust a screen option by using a bright color and increasing transparency, and display a screen, or may control displaying of a related filter, as illustrated in the diagram 1730. Under the condition of the identical fatigue rate of user's eyes (e.g., identical state information), when the present time corresponds to night 1723, the controller 180 may adjust a screen option by using a dark color and decreasing transparency, and display a screen, or may control displaying of a related filter, as illustrated in the diagram 1740.

Referring to FIG. 18, the controller 180 determines the fatigue rate of user's eyes to be different based on state information (e.g., the state of eyes) 1810 obtained by tracking the state of user's eyes and environment information 1820 (e.g., illuminance 1 (e.g., low lux)) 1821 and illuminance 2 (e.g., high lux) 1823).

For example, under the condition of the identical fatigue rate of user's eyes (e.g., identical state information), when the present ambient illuminance corresponds to illuminance 1 (e.g., low lux), the controller 180 may adjust a screen option by using a bright color and increasing transparency, and display a screen, or may control displaying of a related filter, as illustrated in the diagram 1830. Under the condition of the identical fatigue rate of user's eyes (e.g., identical state information), when the present ambient illuminance corresponds to illuminance 2 (e.g., high lux), the controller 180 may adjust a screen option by using a dark color and decreasing transparency and display a screen, or may control displaying of a related filter, as illustrated in the diagram 1840.

Referring to FIG. 19, the controller 180 determines the fatigue rate of user's eyes to be different based on state information (e.g., the state of eyes) 1910 obtained by tracking the state of user's eyes, operation information (e.g., the property of an application) 1920, usage information 1930 (e.g., usage time 1 1931 (e.g., 30 minutes), usage time 2 1933 (e.g., an hour), and usage time 3 1935 (e.g., two hours)).

For example, under the condition of the identical fatigue rate of user's eyes (e.g., identical state information and identical application property), when the usage time of an application corresponds to usage time 1 1931 (e.g., 30 minutes), the controller 180 may adjust a screen option by using a bright color and increasing transparency and display a screen, or may control displaying of a related filter, as illustrated in the diagram 1940. Under the condition of the identical fatigue rate of user's eyes (e.g., identical state information and identical application property), when the usage time of an application corresponds to usage time 2 1933 (e.g., one hour), the controller 180 may adjust a screen option by using a medium-bright color and decreasing transparency by a predetermined level and display a screen, or may control the displaying of a related filter, as illustrated in the diagram 1950. Under the condition of the identical fatigue rate of user's eyes (e.g., identical state information and identical application property), when the usage time of an application corresponds to usage time 3 1935 (e.g., two hours), the controller 180 may adjust a screen option by using a dark color and significantly decreasing transparency and display a screen, or may control the displaying of a related filter, as illustrated in the diagram 1960.

According to embodiments of the present disclosure, under the condition of an identical fatigue rate of user's eye (e.g., identical state information), when the property of a used application is different, a screen option may be adaptively changed and displayed. According to embodiments of the present disclosure, a screen option may be adaptively changed and displayed by taking into consideration state information, environment information, operation information, usage information, and the like, which are considered in the examples of FIGS. 17, 18, and 19.

The embodiments of the present disclosure disclosed herein and shown in the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure as defined by the claims and their equivalents.

What is claimed is:

1. An electronic device, comprising:
   a display;
   a memory storing instructions; and
   one or more processors configured to execute the stored instructions to:
   set a first time period and a second time period in a display setting,
   based on the display setting, detect a first event for operating the display within the first time period, wherein the first event is associated with a security function,
   in response to detecting the first event for operating the display within the first time period:
   control to apply a first color filter to a screen to be displayed immediately after the display is operated, the first color filter corresponding to a first color temperature, and
   control the display to display the screen after applying the first color filter,
   based on the display setting, detect a second event for operating the display within a second time period, wherein the second event associated with the security function, and
   in response to detecting the second event for operating the display within the second time period:
   control to apply a second color filter to the screen to be displayed immediately after the display is operated, the second color filter corresponding to a second color temperature lower than the first color temperature, and
   control the display to display the screen after applying the second color filter.

2. The electronic device of claim 1, wherein an amount of blue color filtered by the second color filter is more than an amount of blue color filtered by the first color filter.

3. The electronic device of claim 2, further comprising:
   at least one sensor configured to detect a location of the electronic device,
   wherein the first time period of the day and the second time period of the day are determined based on the detected location of the electronic device.

4. The electronic device of claim 2, further comprising:
   at least one sensor configured to detect a location of the electronic device,
   wherein the first time period of the day and the second time period of the day are determined based on a local time of the detected location of the electronic device.

5. The electronic device of claim 1, wherein the one or more processors are further configured to execute the stored instructions to:
   control the display to display, based on a user input, a display setting menu for the display setting, the display setting menu including at least one object for setting the second color temperature, and set the second color temperature, based on the user input on the at least one object.

6. The electronic device of claim 1, wherein the one or more processors are further configured to execute the stored instructions to control the display to display, in response to identifying that the timing of the detecting of the second event is within the second time period of the day, the screen after applying the second color filter.

7. The electronic device of claim 5, wherein the display setting menu further includes an object for determining whether to enable the display setting or not.

8. The electronic device of claim 5, wherein the first color temperature of the first color filter and the second color temperature of the second color filter are maintained.

9. A method executed in an electronic device with a display, comprising:
   setting a first time period and a second time period in a display setting;
   based on the display setting, detecting a first event for operating a display within the first time period, wherein the first event is associated with a security function;
   in response to detecting the first event for operating display within the first time period:
   controlling to apply a first color filter to a screen to be displayed immediately after the display is operated, the first color filter corresponding to a first color temperature, and
   controlling the display to display the screen after applying the first color filter,
   based on the display setting, detecting a second event for operating the display within a second time period, wherein the second event is associated with the security function, and
   in response to detecting the second event for operating the display within the second time period:
   controlling to apply a second color filter to the screen to be displayed immediately after the display is operated, the second color filter corresponding to a second color temperature lower than the first color temperature, and
   controlling the display to display the screen after applying the second color filter.

10. The method of claim 9, wherein an amount of blue color filtered by the second color filter is more than an amount of blue color filtered by the first color filter.

11. The method of claim 9, wherein a day time and a night time are determined based on a local time of a location of the electronic device.

12. The method of claim 9, further comprising:
   displaying, based on a user input, a display setting menu for the display setting, the display setting menu including at least one object for setting the second color temperature, and
   setting the second color temperature, based on an input on the at least one object,
   wherein controlling the display to display the screen after applying the second color filter comprises:
   displaying the screen in the set second color temperature.

13. The method of claim 12, wherein the display setting menu further includes an object for determining whether to enable the display setting or not.

14. The method of claim 9, wherein the first color temperature of the first color filter and the second color temperature of the second color filter are maintained.

15. A non-transitory computer readable recording medium having stored thereon a plurality of instructions, which when executed by one or more processors of an electronic device with a display, perform a method comprising:
- setting a first time period and a second time period in a display setting;
- based on the display setting, detecting a first event for operating a display within the first time period, wherein the first event is associated with a security function;
- in response to detecting the first event for operating display within the first time period:
- controlling to apply a first color filter to a screen to be displayed immediately after the display is operated, the first color filter corresponding to a first color temperature, and
- controlling the display to display the screen after applying the first color filter,
- based on the display setting, detecting a second event for operating the display within a second time period, wherein the second event is associated with the security function, and
- in response to detecting the second event for operating the display within the second time period:
- controlling to apply a second color filter to the screen to be displayed immediately after the display is operated, the second color filter corresponding to a second color temperature lower than the first color temperature, and
- controlling the display to display the screen after applying the second color filter.

16. The non-transitory computer readable recording medium of claim 15, wherein an amount of blue color filtered by the second color filter is more than an amount of blue color filtered by the first color filter.

17. The non-transitory computer readable recording medium of claim 15, wherein a day time and a night time are determined based on a local time of a location of the electronic device.

18. The non-transitory computer readable recording medium of claim 15, the method further comprising:
- displaying, based on a user input, a display setting menu for the display setting, the display setting menu including at least one object for setting the second color temperature, and
- setting the second color temperature, based on an input on the at least one object,
- wherein controlling the display to display the screen after applying the second color filter comprises:
- displaying the screen in the set second color temperature.

19. The non-transitory computer readable recording medium of claim 15, wherein the display setting menu further includes an object for determining whether to enable the display setting or not.

20. The non-transitory computer readable recording medium of claim 15, wherein the first color temperature of the first color filter and the second color temperature of the second color filter are maintained.

\* \* \* \* \*